United States Patent [19]

Tokumitsu et al.

[11] Patent Number: 4,815,027

[45] Date of Patent: Mar. 21, 1989

[54] OPTICAL OPERATION APPARATUS FOR EFFECTING PARALLEL SIGNAL PROCESSING BY DETECTING LIGHT TRANSMITTED THROUGH A FILTER IN THE FORM OF A MATRIX

[75] Inventors: Jun Tokumitsu; Kenji Saito; Yuichi Handa; Nobuyoshi Tanaka, all of Tokyo; Hidetoshi Nojiri, Matsudo, all of Japan

[73] Assignee: Canon Kabushiki Kaisha, Tokyo, Japan

[21] Appl. No.: 102,789

[22] Filed: Sep. 23, 1987

Related U.S. Application Data

[63] Continuation of Ser. No. 721,949, Apr. 11, 1985, abandoned.

[30] Foreign Application Priority Data

| Apr. 13, 1984 | [JP] | Japan | 59-74541 |
| Apr. 13, 1984 | [JP] | Japan | 59-74542 |
| Apr. 13, 1984 | [JP] | Japan | 59-74543 |
| Apr. 13, 1984 | [JP] | Japan | 59-74540 |
| Oct. 2, 1984 | [JP] | Japan | 59-205603 |

[51] Int. Cl.$^4$ .......................... G06G 9/00; G06G 7/16
[52] U.S. Cl. ..................... 364/841; 364/807; 364/845; 350/96.14; 350/96.16; 350/358
[58] Field of Search ............... 364/807, 819, 821–822, 364/837, 841, 845, 713, 604, 606, 728, 754; 350/96.1, 96.11–96.17, 162.11, 162.12, 355, 356, 358, 320, 321

[56] References Cited

U.S. PATENT DOCUMENTS

| 4,009,380 | 2/1977 | Bocker et al. | 364/713 X |
| 4,566,077 | 1/1986 | Schuöcker et al. | 364/845 |
| 4,567,569 | 1/1986 | Cawfield et al. | 364/845 |
| 4,569,033 | 2/1986 | Collins et al. | 364/845 |
| 4,588,255 | 5/1986 | Tur et al. | 350/96.16 |
| 4,595,994 | 6/1986 | Verber et al. | 364/841 |
| 4,603,398 | 7/1986 | Bocker et al. | 364/845 |

OTHER PUBLICATIONS

J. W. Goodman, A. R. Dias, and L. M. Woody, "Fully Parallel, High-Speed Incoherent Optical method for Performing Discrete Fourier Transforms", *Optics Letters*, Jan. 1978, vol. 2, No. 1, pp. 1–3.

*Primary Examiner*—Gary V. Harkcom
*Attorney, Agent, or Firm*—Fitzpatrick, Cella, Harper & Scinto

[57] ABSTRACT

In an optical operation apparatus, a light source emits a light intensity-modulated on the basis of a first electrical signal. A modulating device receives the light from the light source and intensity-modulates the light on the basis of the first signal, and a photoelectric converting device converts the light modulated by the modulating device into a second electrical signal. These functions are carried out by any of a number of different arrangements of filter elements, and electro-optical or acoustico-optical devices can be used for intensity modulation.

31 Claims, 18 Drawing Sheets

FIG. 1
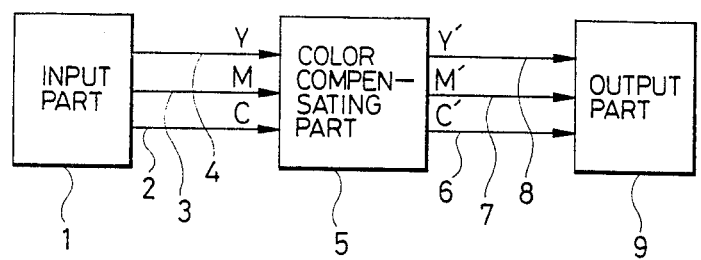
FIG. 2
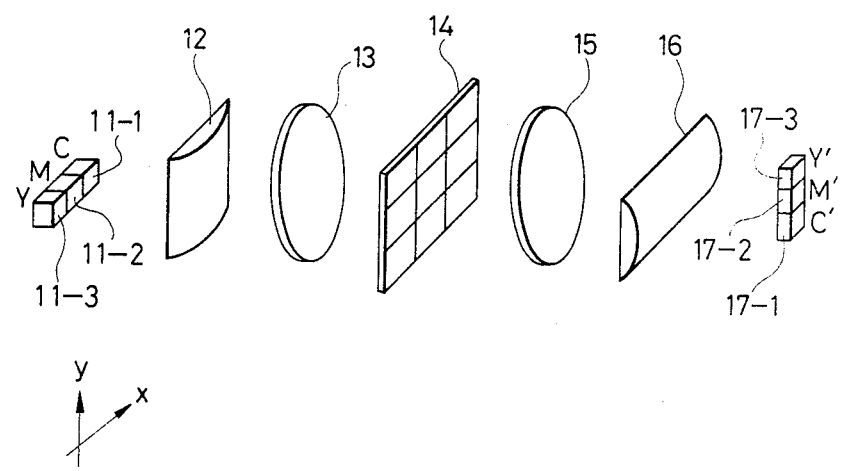
FIG. 3
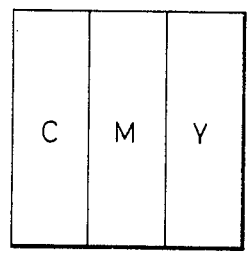
FIG. 4
| a00 | a01 | a02 |
| --- | --- | --- |
| a10 | a11 | a12 |
| a20 | a21 | a22 |

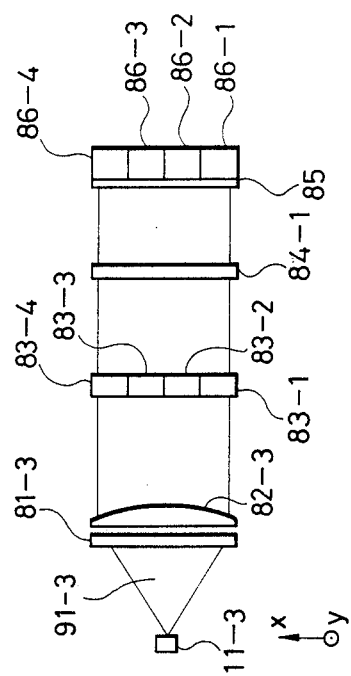
FIG. 15
FIG. 14
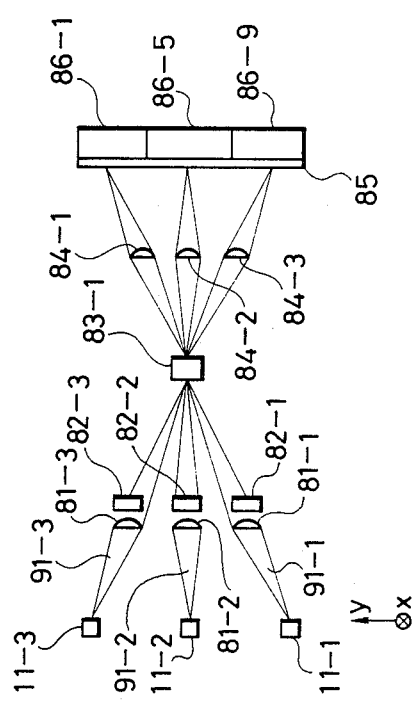
FIG. 18
FIG. 17
FIG. 16

FIG. 26

| $a_{00}C$ | $b_{00}C^2$ | | |
|---|---|---|---|
| $a_{01}M$ | $b_{03}MC$ | $b_{01}M^2$ | |
| $a_{02}Y$ | $b_{05}YC$ | $b_{04}YM$ | $b_{02}Y^2$ |

FIG. 25

| $a_{00}$ | $b_{00}$ | | |
|---|---|---|---|
| $a_{01}$ | $b_{03}$ | $b_{01}$ | |
| $a_{02}$ | $b_{05}$ | $b_{04}$ | $b_{02}$ |

FIG. 24

| Y | M | C |
|---|---|---|
| YC | MC | $C^2$ |
| YM | $M^2$ | CM |
| $Y^2$ | MY | CY |

FIG. 27

| $a_{00}$ | $a_{10}$ | $a_{20}$ | $a_{01}$ | $a_{11}$ | $a_{21}$ | $a_{02}$ | $a_{12}$ | $a_{22}$ |
|---|---|---|---|---|---|---|---|---|
| $b_{00}$ | $b_{10}$ | $b_{20}$ | $b_{03}$ | $b_{13}$ | $b_{23}$ | $b_{05}$ | $b_{15}$ | $b_{25}$ |
| ... | ... | ... | ... | ... | ... | ... | ... | ... |

FIG. 32

| C² | CM | CY | C |
|---|---|---|---|
| CM | M² | MY | M |
| CY | MY | Y² | Y |

FIG. 33

| b00 | b03 | b05 | a00 |
|---|---|---|---|
|  | b01 | b04 | a01 |
|  |  | b02 | a02 |

FIG. 34

| $b_{00}C^2$ | $b_{03}CM$ | $b_{05}CY$ | $a_{00}C$ |
|---|---|---|---|
|  | $b_{01}M^2$ | $b_{04}MY$ | $a_{01}M$ |
|  |  | $b_{02}Y^2$ | $a_{02}Y$ |

FIG. 35

| b21 | b11 | b01 | b25 | b15 | b05 | a21 | a11 | a01 |
|---|---|---|---|---|---|---|---|---|
| b23 | b13 | b03 | b24 | b14 | b04 | a20 | a10 | a00 |

OPTICAL OPERATION APPARATUS FOR EFFECTING PARALLEL SIGNAL PROCESSING BY DETECTING LIGHT TRANSMITTED THROUGH A FILTER IN THE FORM OF A MATRIX

This application is a continuation of application Ser. No. 721,949 filed Apr. 11, 1985, now abandoned.

BACKGROUND OF THE INVENTION

1. Field of the Invention

This invention relates to an apparatus which uses light to effect various operation processes.

2. Description of the Prior Art

In the field of signal processing, where strains of various signals are removed and further various correction processes are effected on the signals, an operation based on the signals is effected. As a specific example of such operation, compensation of a color signal may be mentioned.

In a color recording apparatus or a color display apparatus, it is necessary to convert an input color signal into a desired color signal by the strain of the read color signal in the image input portion or the deviation or the like from the ideal color characteristic of a recording medium or a display medium and correct the color signal. For example, in a color laser beam printer or a color ink jet printer, toner or ink does not have an ideal spectral reflection factor distribution characteristic of cyan, magenta and yellow as primary colors and therefore, if a colored image is recorded without effecting color compensation on the input color signal, there can only be obtained an image of very low quality, different from the intended hue.

Thus, it has heretofore been practised to obtain an intended output color signal by operation-processing an input color signal by an electric circuit, but in this method, the processing speed is low and therefore, where the number of picture elements is great, the processing time is long and also, if an attempt is made to effect high-degree color compensation processing, it has led to a disadvantage that the processing time becomes longer and the electric circuit for the processing becomes complicated.

On the other hand, in place of the operation by electric circuit as described above, a system which effectively utilized the high speed and parallelism of light to effect complicated operations at a high speed, i.e., a so-called optical operation apparatus, has been waited for and one is proposed, for example, in "Optical Letters, Vol. 2, No. 1, Jan. 1978". However, these propositions have many problems which hinders putting them into practice in terms of ease of handling, ability of operation, etc.

SUMMARY OF THE INVENTION

It is an object of the present invention to solve the problems peculiar to the prior art and to provide an optical operation apparatus of higher realizability.

It is another object of the present invention to provide an optical operation apparatus of simple and compact construction.

It is still another object of the present invention to provide an optical operation apparatus which is capable of accomplishing more complicated operations at a high speed.

The above objects of the present invention are achieved by an optical operation apparatus comprising a light source for emitting light intensity-modulated on the basis of a first electrical signal, means for intensity-modulating the light from the light source on the basis of a predetermined operation formula, and photoelectric converting means for converting the light modulated by the modulating means into a second electrical signal.

DESCRIPTION OF THE DRAWINGS

FIG. 1 is a block diagram of a color image recording apparatus containing the optical operation apparatus of the present invention therein.

FIG. 2 is a schematic perspective view illustrating the concept when the optical operation apparatus is applied to color compensation operation.

FIG. 3 shows the distribution of light beams immediately before they enter the filter of FIG. 2.

FIG. 4 is a schematic plan view of the filter of FIG. 2.

FIG. 14 is a side view of the apparatus shown in FIG. 13.

FIG. 15 is a plan view of the apparatus shown in FIG. 13.

FIG. 16 shows the distribution of light beams immediately before they enter the filter of FIG. 13.

FIG. 17 is a schematic plan view of the filter of FIG. 13.

FIG. 18 is a plan view of the filter in a sixth embodiment of the present invention.

FIG. 24 shows the distribution of light beams immediately before they enter the filter of FIG. 23.

FIG. 25 is a schematic plan view of the filter of FIG. 23.

FIG. 26 shows the distribution of light beams immediately after they have been transmitted through the filter of FIG. 23.

FIG. 27 is a fragmentary plan view of a filter in a modification of the apparatus shown in FIG. 23.

FIG. 32 shows the distribution of light beams immediately before they enter the filter of FIG. 31.

FIG. 33 is a schematic plan view of the filter of FIG. 31.

FIG. 34 shows the distribution of light beams immediately after they have been transmitted through the filter of FIG. 31.

FIG. 35 is a fragmentary plan view of a filter in a modification of the apparatus shown in FIG. 31.

DESCRIPTION OF THE PREFERRED EMBODIMENTS

Figures 5, 6, 7:
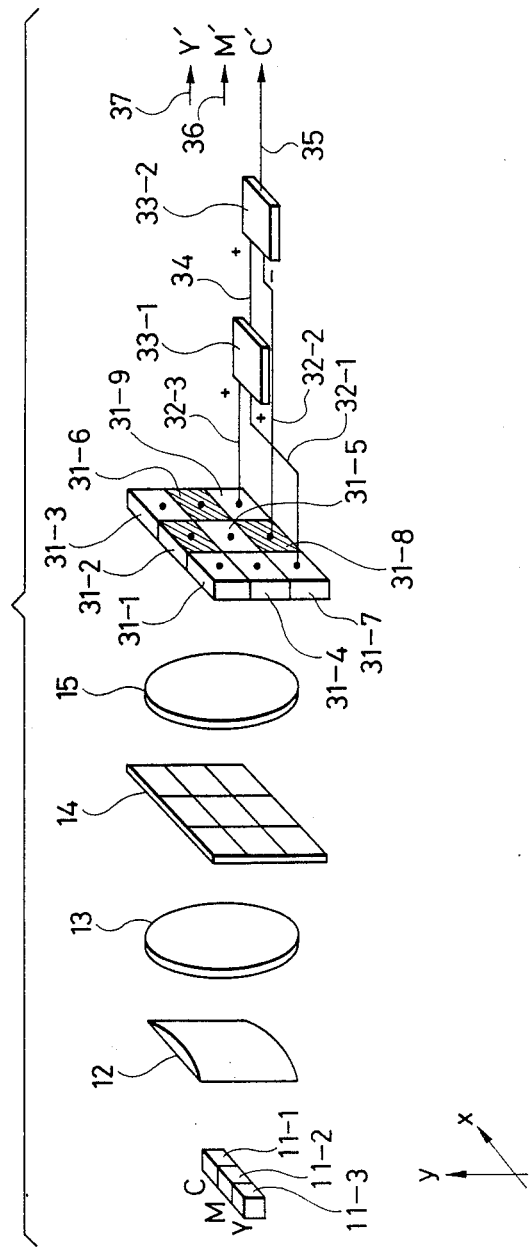
FIG. 5 shows the distribution of light beams immediately after they have been transmitted through the filter of FIG. 2.
FIG. 6 is a schematic partial perspective view of a first embodiment of the present invention.
FIG. 7 shows the distribution of light beams immediately after they have been transmitted through the filter of FIG. 6.

Some embodiments of the present invention will hereinafter be described with reference to the drawings. The embodiments will be described with respect to color compensation operation.

FIG. 1 is a block diagram of a color image recording apparatus containing the optical operation apparatus of the present invention therein In FIG. 1, reference numeral 1 designates an input part, reference numeral 5 denotes a color compensating part, i.e., an optical operation apparatus according to the present invention, and reference numeral 9 designates an output part. In the input part 1, a colored original is read by an image sensor such as a CCD. Filters of cyan, magenta and yellow which are primary colors are provided on the light-receiving portion of the image sensor, whereby color signals (electrical signals) are obtained, and in the input part 1, pre-processing such as logarithmic conversion is carried out and a cyan signal (hereinafter referred to as the "C signal") 2, a magenta signal (hereinafter referred to as the "M signal") 3 and a yellow signal (hereinafter referred to as the "Y signal") 4 are put out to the color compensating part 5. In the color compensating part 5, the following operation is eeffected, and a compensated cyan signal (hereinafter referred to as the "C' signal") 6, a compensated magenta signal (hereinafter referred to as the "M' signal)" 7 and a compensated yellow signal (hereinafter referred to as the "Y' signal") 8 are put out to the output part 9.

$$\begin{pmatrix} C' \\ M' \\ Y' \end{pmatrix} = A \begin{pmatrix} C \\ M \\ Y \end{pmatrix} + B \begin{pmatrix} C_2 \\ M_2 \\ Y_2 \\ CM \\ MY \\ YC \end{pmatrix} \quad (1)$$

where $$A = \begin{pmatrix} a_{00} & a_{01} & a_{02} \\ a_{10} & a_{11} & a_{12} \\ a_{20} & a_{21} & a_{22} \end{pmatrix} \quad (2)$$

$$B = \begin{pmatrix} b_{00} & b_{01} & b_{02} & b_{03} & b_{04} & b_{05} \\ b_{10} & b_{11} & b_{12} & b_{13} & b_{14} & b_{15} \\ b_{20} & b_{21} & b_{22} & b_{23} & b_{24} & b_{25} \end{pmatrix} \quad (3)$$

The first term of the right side of equation (1) above comprises the first-order term of C, M and Y, and in a simple color compensation process, the processing is effected up to this term. A is the coefficient matrix of the first-order term, and usually the diagonal element is 1. The second term of the right side of equation (1) above is the second-order term of C, M and Y, and in a high-degree color compensation process, the processing is effected including this term. B is the coefficient matrix of the second-order term. Each element of A and B may assume a positive or negative value, but for convenience of description, it is to be understood that all of $a_{00}$–$a_{33}$ and $b_{00}$–$b_{25}$ are positive values.

FIG. 2 is a view for illustrating the concept when the optical operation apparatus is applied to the operation up to the first term of the color compensation as described above. In FIG. 2, reference numerals 11-1, 11-2 and 11-3 designate light-emitting diodes (hereinafter referred to as the LEDs) The C signal, the M signal and the Y signal are input to these LEDs, respectively, which are arranged in a row in the indicated x direction. Reference numeral 12 designates a cylindrical lens whose direction of bus line is the y direction. Reference numeral 13 denotes a spherical lens. Reference numeral 14 designates a matrix filter having each matrix element of equation (2) as a transmission factor. Reference numeral 15 denotes a spherical lens. Reference numeral 16 designates a cylindrical lens whose direction of bus line is the x direction. Reference numerals 17-1, 17-2 and 17-3 denote photodetectors which put out the C' signal, the M' signal and the Y' signal, respectively.

The LEDs 11-1, 11-2 and 11-3 emit lights of intensities proportional to the signal intensities of the C signal, the M signal and the Y signal, respectively. The cylindrical lens 12 and the spherical lens 13 together constitute an anamorphic optical system, and in the x direction, the light-emitting surfaces of the LEDs 11-1, 11-2 and 11-3 are imaged on the filter 14 by the cylindrical lens 12 and the spherical lens 13, and on the other hand, the LEDs 11-1, 11-2 and 11-3 are placed on the forward focal plane of the spherical lens 13 and, in the y direction, the light beams from the LEDs are caused to enter the filter 14 in parallelism to one another while being diffused to the same degree as the length of the filter in the y direction.

FIG. 3 shows the distribution of the light beams immediately before they enter the filter 14, and this is a view as observed from the right in FIG. 2. Each light beam has an intensity proportional to the shown value.

FIG. 14 is a schematic plan view of the filter 14. The filter 14 is divided into nine portions in the form of a matrix, and the light transmission factors of the respective portions are proportional to the elements of the matrix A shown in equation (2) above, as shown. The matrix filter 14 can be realized by an ND filter in which the density of each matrix element portion has been changed, or may be realized by providing openings of areas proportional to the elements of the matrix A in the respective matrix element portions of a light-intercepting plate. As a further alternative, the filter 14 may be realized by evaporating a metal such as chromium in the form of numerous dots on a transparent glass plate and partially forming a light-intercepting film and making the areas of the light-transmitting portions of the respective matrix element portions proportional to the elements of the matrix A. FIG. 4 is a view as observed from the right in FIG. 2.

In FIG. 2, the spherical lens 15 and the cylindrical lens 16 together constitute an anamorphic optical system and, in y direction, the filter 14 is imaged on the photodetectors 17-1, 17-2 and 17-3 and on the other hand, the filter 14 is placed on the forward focal plane of the spherical lens 15 and, in the x direction, the light beam from each point on the filter 14 is uniformly diffused on the photodetectors 17-1, 17-2 and 17-3.

FIG. 5 shows the distribution of the light beams immediately after they have been transmitted through the filter 14, and this is a view as observed from the right in FIG. 2. Each light beam has an intensity proportional to the shown value.

Light beams of intensities proportional to $a_{00}C+a_{01}M+a_{02}Y$, $a_{10}C+a_{11}M+a_{12}M$ and $a_{20}C+a_{21}M+a_{22}Y$ enter the photodetectors 17-1, 17-2 and 17-3, respectively. As is apparent from equation (1), these are proportional to the C' signal, the M' signal and the Y' signal, respectively. The C' signal, the M' signal and the Y' signal are put out from the photo-detectors 17-1, 17-2 and 17-3, respectively.

However, the operations effected in the apparatus of FIG. 2 are only multiplication and addition and therefore, the color compensation process cannot be accomplished when the negative sign is given to the elements of the matrix A of equation (2) above.

A schematic partial perspective view of a first embodiment of the present invention which solves the above-noted problem and which is constructed so as to be applicable to the actual color compensation is shown in FIG. 6. In FIG. 6, members similar to those in FIG. 2 are given similar reference numerals and need not be described.

In FIG. 6, reference numerals 31-1, 31-2, . . . , 31-9 designate photodetectors arranged in the form of a matrix. Reference numerals 32-1, 32-2 and 32-3 denote the output signal lines from the photodetectors 31-7, 31-8 and 31-9, respectively. Reference numerals 33-1 and 33-2 designate adders, and reference numerals 34 and 35 denote the output signal lines from the adders 33-1 and 33-2. Signal lines and adder systems similar to those for the photodetectors 31-7, 31-8 and 31-9 are provided for the photodetectors 31-4, 31-5 and 31-6 and the photodetectors 31-1, 31-2 and 31-3, and reference numerals 36 and 37 designate those output signal lines The C' signal, the M' signal and the Y' signal are put out from the output signal lines 35, 36 and 37, respectively.

In FIG. 6, the filter 14 is imaged on the photodetectors 31-1, 31-2, . . . , 31-9 by the spherical lens 15. FIG. 7 shows the distribution of light beams entering the respective photodetectors. This is a view as observed from the right in FIG. 6. Each light beam has an intensity proportional to the shown value. Here, let it be assumed that the negative sign is given to the elements $a_{21}$, $a_{10}$ and $a_{01}$ of the matrix A which are related to the light beams entering the photodetectors 31-2, 31-6 and 31-8 (indicated by hatching in FIG. 6). The output signals from the output signal lines 32-1, 32-2 and 32-3 are proportional to $a_{02}M$, $a_{01}M$ and $a_{00}C$, respectively. The output signals from the signal lines 32-1 and 32-3 are added together by the adder 33-1, and by inputting the output signal of the adder 33-1 and the output signal from the signal line 32-2 to the adder 33-2 at the reverse sign and effecting subtraction, an output color signal which is $a_{00}C - a_{01}M + a_{02}Y = C'$ is obtained from the signal line 35. The adders 33-1 and 33-2 may be put into a lump and the addition and subtraction of three signal values can be executed at a time. By effecting similar signal processing with respect also to the photodetectors 31-4, 31-5 and 31-6 and the photodetectors 31-1, 31-2 and 31-3, output color signals which are $-a_{10}C + a_{11}M + a_{12}Y = M$ and $a_{20}C - a_{21}M + a_{22}Y = Y'$ are obtained from signal lines 36 and 37.

Instead of the spherical lens 15 in the present embodiment, use may be made of a lens array which performs a similar action. As such a lens array, use may be made of one formed of plastics such as PMMA, or one which is endowed with a lens action by ion-exchanging glass and imparting a refractive index distribution thereto. Also, instead of the spherical lens 15, use may be made of a one-to-one magnification imaging element such as Celfoc lens. In these cases, it is of course necessary to suitably change the combination of photodetector output signals which effect addition and subtraction in conformity with the imaging relation between each matrix element portion of the filter 14 and each photodetector.

Figure 8:
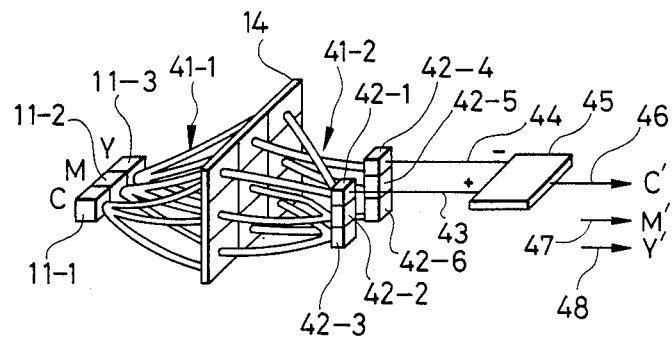
FIG. 8 is a schematic partial perspective view of a second embodiment of the present invention.

FIG. 8 is a schematic partial perspective view showing a second embodiment of the optical operation apparatus of the present invention. In FIG. 8, members similar to those in FIG. 2 are given similar reference numerals and need not be described.

In FIG. 8, reference numerals 41-1 and 41-2 designate optical fiber bundles, and the optical fiber bundle 41-1 trisects the lights emitted from LEDs 11-1, 11-2 and 11-3, respectively, and divides them in y direction and causes them to enter the respective matrix element portions of the filter 14. Reference numerals 42-1, 42-2, . . . , 42-6 denote photodetectors. The photodetectors 42-1, 42-2 and 42-3 and the photodetectors 42-4, 42-5 and 42-6 are arranged in a respective row in the y direction. Here, let it be assumed that the negative sign is given to the elements $a_{01}$, $a_{12}$ and $a_{21}$ of the matrix A. The emergent light beams from the matrix element portions of the filter 14 are directed to one end of the optical fibers, and in the bundle 41-2 of the optical fibers, each optical fiber has the other end thereof connected to one of the photodetectors 42-1, 42-2, . . . , 42-6 without the positional relation thereof in the y direction being reversed. Of the lights from LEDs 11-1 and 11-3, the emergent light transmitted through the uppermost matrix element portion of the filter 14 in the y direction enters the photodetector 42-1, and on the other hand, of the light from LED 11-2, the emergent light transmitted through the uppermost matrix element portion of the filter 14 in the y direction enters the photodetector 42-4. Reference numerals 43 and 44 designate the output signal lines from the photodetectors 42-1 and 42-4, respectively, reference numeral 45 denotes an adder and reference numeral 46 designates the output signal line from the adder 45. A signal proportional to $(a_{00}C+a_{02}Y)$ is put out from a signal line 43 and on the other hand, a signal proportional to $a_{01}M$ is put out from a signal line 44, and by inputting these output signals to the adder 45, at the reverse sign and effecting subtraction, an output color signal which is $a_{00}C-a_{01}M+a_{02}Y=C'$ is obtained from the signal line 46. By suitably effecting the connection of the optical fibers to the photodetectors 42-2 and 42-5 and the photodetectors 42-3 and 42-6 and the processing of the output signals from these photodetectors in a similar manner, output color signals which are $a_{10}C+a_{11}M-a_{12}Y=M'$ and $a_{20}C-a_{21}M+a_{22}Y=Y'$ are obtained from signal lines 47 and 48, respectively.

In the apparatus of the present embodiment, the respective elements are connected together by the optical fibers and therefore, a sufficiently stable operation is ensured even if an extraneous force such as vibration is applied to the apparatus. Also, the present embodiment has the effect of shortening the length of the optical path and thereby making the apparatus compact.

Figure 9:
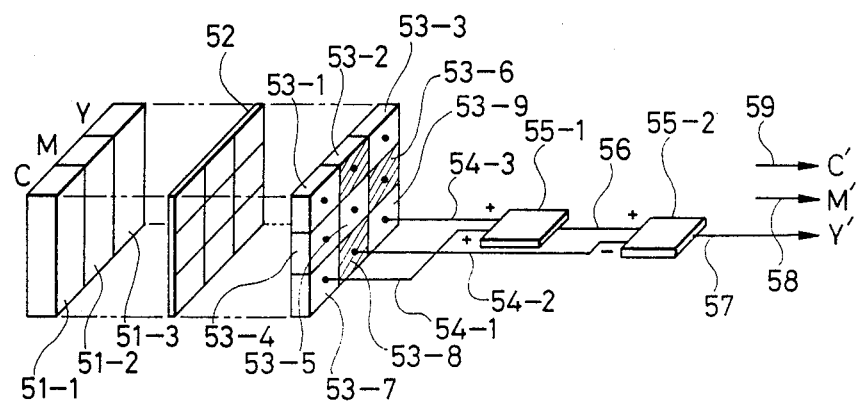
FIG. 9 is a schematic exploded perspective view of a third embodiment of the present invention.

FIG. 9 is a schematic exploded perspective view of a third embodiment of the present invention in which the construction of the apparatus is simplified and made compact. In FIG. 9, reference numerals 51-1, 51-2 and 51-3 designate LEDs to which are input the C signal, the M signal and the Y signal, respectively. These LEDs are of the so-called surface light emission type. Reference numeral 52 denotes a matrix filter having each matrix element of equation (2) as the transmission factor. Reference numerals 53-1, 53-2, ..., 53-9 designate photodetectors arranged in the form of a matrix. Reference numerals 54-1, 54-2 and 54-3 denote the output signal lines from the photodetectors 53-7, 53-8 and 53-9, respectively. Reference numerals 55-1 and 55-2 designate adders, and reference numerals 56 and 57 denote the output signal lines from these adders, respectively. Signal lines and adder systems similar to those for the photodetectors 53-7, 53-8 and 53-9 are provided for the photodetectors 53-4, 53-5 and 53-6 and the photodetectors 53-1, 53-2 and 53-3, and reference numerals 58 and 59 denote those output signal lines. The Y' signal, the M' signal and the C' signal are put out from the output signal lines 57, 58 and 59, respectively.

The LEDs 51-1, 51-2 and 51-3 emit lights of intensities proportional to the signal intensities of the C signal, the M signal and the Y signal, respectively. The filter 52 may be one similar to that shown in FIG. 4.

Figure 10:
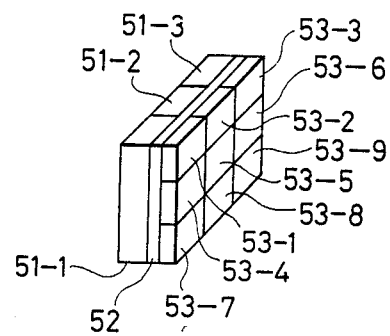
FIG. 10 is a perspective view of the optical system portion of the FIG. 9 apparatus.

FIG. 10 is a perspective view of the optical system portion of the apparatus of the present embodiment. In the apparatus of the present embodiment, the LEDs, the filter and the photodetectors are made integral with one another. The matrix element portions of the filter 52 are disposed correspondingly to one of the photodetectors 53-1, 53-2, ..., 53-9, the LED 51-1 is disposed correspondingly to the photodetectors 53-1, 53-4 and 53-7, the LED 51-2 is disposed correspondingly to the photodetectors 53-2, 53-5 and 53-8, and the LED 51-3 is disposed correspondingly to the photodetectors 53-3, 53-6 and 53-9.

Accordingly, the intensities of the light beams entering the photodetectors and the signals put out from the photodetectors are proportional to $a_{00}C$, $a_{01}M$, $a_{02}Y$, $a_{10}C$, $a_{11}M$, $a_{12}Y$, $a_{20}C$, $a_{21}M$ and $a_{22}Y$, respectively, with respect to the photodetectors 53-1, 53-2, ..., 53-9. Here, let it be assumed that the negative sign is given to the elements $a_{01}$, $a_{12}$ and $a_{21}$ of the matrix A which are related to the light beams entering the photodetectors 53-2, 53-6 and 53-8 (indicated by hatching in FIG. 9). The output signals from the output signal lines 54-1 and 54-3 are added together by the adder 55-1, and by inputting the output signal of the adder and the output signal from the signal line 54-2 to the adder 55-2 at the reverse sign and effecting subtraction, an output color signal which is $a_{20}C-a_{21}M+a_{22}Y=Y'$ is obtained from the signal line 57. The adders 55-1 and 55-2 can be put into a lump and the addition and subtraction of three signal values can be executed at a time. By effecting similar signal processing with respect also to the photodetectors 53-4, 53-5 and 53-6 and the photodetectors 53-1, 53-2 and 53-3, color signals which are $a_{10}C+a_{11}M-a_{12}Y=M'$ and $a_{00}C-a_{01}M+a_{02}Y=C'$ are obtained from the signal lines 58 and 59, respectively.

Thus, the response time of the order of 10 m sec. of the light emission of the LEDs and the light reception of the photodetectors is easily obtained and therefore, a very high processing speed is obtained. Also, the construction of the apparatus including the light source portion can be simplified and made compact.

Figure 11:
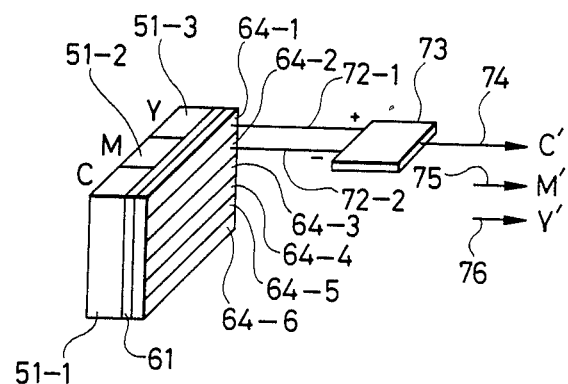
FIG. 11 is a schematic partial perspective view of a fourth embodiment of the present invention.

FIG. 11 is a schematic partial perspective view showing a fourth embodiment of the optical operation apparatus of the present invention. In FIG. 11, reference numerals 51-1, 51-2 and 51-3 designate LEDs similar to those in the above-described third embodiment. Reference numeral 61 denotes a filter, and reference numeral 64-1, 64-2, ..., 64-6 designate photodetectors. Reference numerals 72-1 and 72-2 denote the output signal lines from the photodetectors 64-1 and 64-2, respectively. Reference numeral 73 designates an adder, and reference numeral 74 denotes the output signal line from the adder 73. Signal lines and adder systems similar to those for the photodetectors 64-1 and 64-2 are provided for the photodetectors 64-3 and 64-4 and the photodetectors 64-5 and 64-6, and reference numerals 75 and 76 designate those output signal lines. The C' signal, the M' signal and the Y' signal are put out from the output signal lines 74, 75 and 76, respectively.

Figure 12:
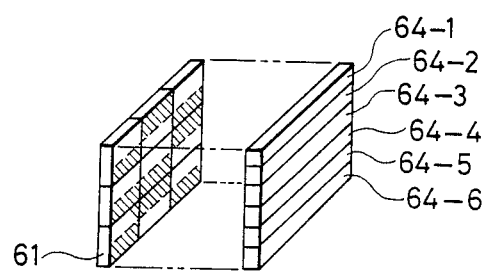
FIG. 12 is a schematic exploded perspective view of the filter and photodetectors in the apparatus shown in FIG. 11.

FIG. 12 is a schematic exploded perspective view of the filter 61 and the photodetectors in the apparatus of the present embodiment. The filter 61 is one having portions of different transmission factors in the form of a matrix similarly to that used in the above-described third embodiment (that is, as shown in FIG. 4), and further, as shown in FIG. 12, the matrix element portions are divided into two upper and lower stages and light-intercepting filters (indicated by hatching in FIG. 12) are attached to one of them. The portions to which the light-intercepting filters are determined in the following manner. Where the negative sign is not given to the elements of the matrix A which are related to the light transmission factors of the matrix element portions, light-intercepting filters are attached to the lower one of the divided two upper and lower stages of the matrix element portions, and on the other hand, where the negative sign is given to the related matrix elements, light-intercepting filters are attached to the upper one of the divided two upper and lower stages of the matrix element portions. In the present embodiment, it is to be understood that, of the elements of the matrix A, only $a_{01}$, $a_{12}$ $a_{21}$ are given the negative sign. The photodetectors 64-1, 64-2, ..., 64-6 are arranged in a stripe-like form and are disposed correspondingly to the upper divided portion of $a_{00}$, $a_{01}$ and $a_{02}$, the lower divided portion of $a_{00}$, $a_{01}$ and $a_{02}$, the upper divided portion of $a_{10}$, $a_{11}$ and $a_{12}$, the lower divided portion of $a_{10}$, $a_{11}$ and $a_{12}$, the upper divided portion of $a_{20}$, $a_{21}$ and $a_{22}$, the lower divided portion of $a_{20}$, $a_{21}$ and $a_{22}$, respectively, of the matrix elements of the matrix element portions of the filter 61.

Accordingly, the intensity of the light beam entering the photodetector 64-1 and the signal put out from the photodetector 64-1 to the signal line 72-1 are proportional to $a_{00}C + a_{02}Y$, and likewise, the intensity of the light beam entering the photodetector 64-2 and the signal put out from the photodetector 64-2 to the signal line 72-2 are proportional to $a_{01}M$. By inputting these two output signals to the adder 73 at the reverse sign and effecting subtraction, an output color signal which is $a_{00}C - a_{01}M + a_{02}Y = C'$ is obtained from the signal line 74. In a similar manner, output color signals which are $a_{10}C + a_{11}M - a_{12}Y = M'$ and $a_{20}C - a_{21}M + a_{22}Y = Y'$ are obtained from the signal lines 75 and 76, respectively.

Figure 13:
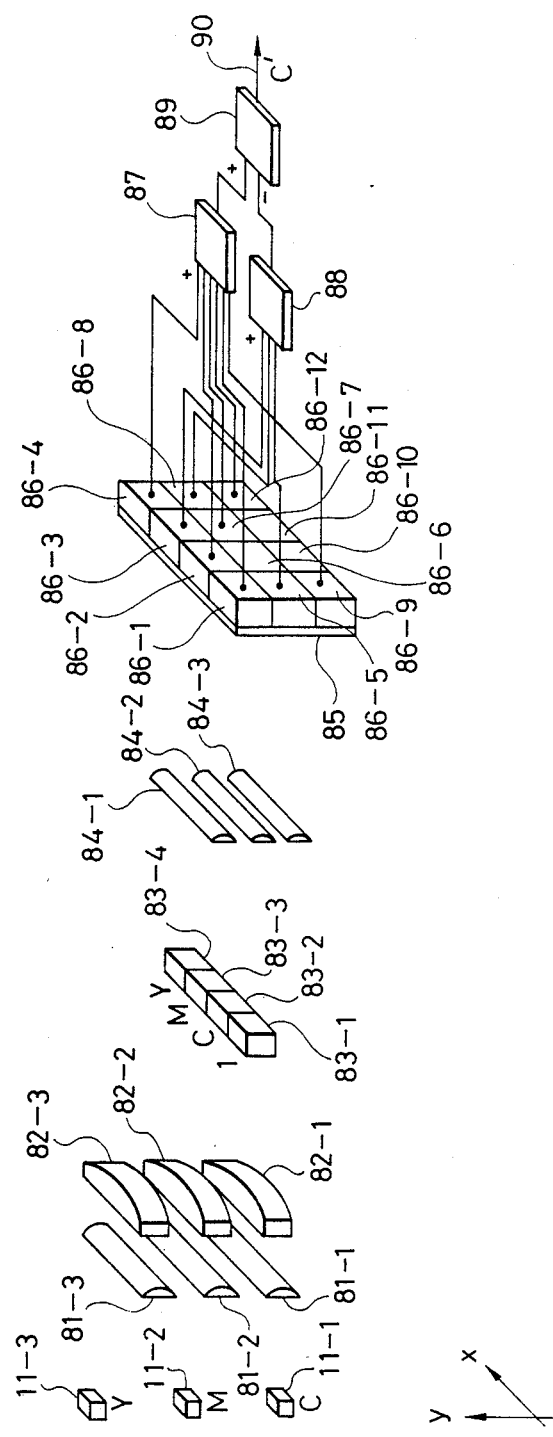
FIG. 13 is a schematic perspective view of a fifth embodiment of the present invention.

FIG. 13 is a schematic perspective view showing a fifth embodiment of the optical operation apparatus of the present invention. In the above-described first to fourth embodiments, the color compensation by the operation up to the first term of the right side of equation (1) has been effected, whereas in the present embodiment, there is shown an example in which the color compensation by the operation up to the second term of the right side of equation (1). In FIG. 13, reference numerals 11-1, 11-2 and 11-3 designate LEDs similar to those in FIG. 2. Reference numerals 81-1, 81-2 and 81-3 denote cylindrical lenses whose directions of bus line are x direction. Reference numerals 82-1, 82-2 and 82-3 designate cylindrical lenses whose direction of bus line is the y direction. Reference numerals 83-1, 83-2, 83-3 and 83-4 denote space light modulators which may be, for example, PLZT light modulators or liquid crystal light modulators. Reference numerals 84-1, 84-2 and 84-3 designate cylindrical lenses whose direction of bus line is the x direction. Reference numeral 85 denotes a matrix filter having each element of the matrices of equations (2) and (3) as the transmission factor. Reference numerals 86-1, 86-2, ..., 86-12 designate photodetectors disposed at positions corresponding to the matrix element portions of the matrix filter 85. Reference numerals 87, 88 and 89 denote adders, and reference numeral 90 designates the output signal line from the adder 89.

FIGS. 14 and 15 are a front view and a plan view, respectively, of the optical system portion of the apparatus of the present embodiment. In these Figures, reference numerals 91-1, 91-2 and 91-3 denote light beams emitted from the LEDs 11-1, 11-2 and 11-3.

The LEDs 11-1, 11-2 and 11-3 emit lights of intensities proportional to the signal intensities of the C signal, the M signal and the Y signal, respectively. The cylindrical lenses 81-1, 81-2 and 81-3 and the cylindrical lenses 82-1, 82-2 and 82-3 together constitute an anamorphic optical system which, in the x direction, makes the light beams 91-1, 91-2 and 91-3 substantially parallel and, in the y direction, images the light-emitting surfaces of the LEDs 11-1, 11-2 and 11-3 on the space light modulators 83-1, 83-2, 83-3 and 83-4. The transmission factors of the space light modulators 83-1, 83-2, 83-3 and 83-4 are 1 (that is, unit intensity) and proportional to the C signal, the M signal and the Y signal. The transmission factor of the space light modulator 83-1 is a predetermined value and therefore, actually, the space light modulator 83-1 may simply be provided with an opening of a suitable size and no special light modulator is necessary. The light beams transmitted through the light modulators 83-1, 83-2, 83-3 and 83-4 are caused to enter the filter 85 by the cylindrical lenses 84-1, 84-2 and 84-3 while remaining substantially parallel in the x direction and are condensed on the filter 85 in the y direction (that is, the light modulators 83-1, 83-2, 83-3 and 83-4 are imaged on the filter 85). The light beam entering the cylindrical lens 84-1 is the light beam transmitted through the cylindrical lenses 81-1 and 82-1, and likewise, the light beam entering the cylindrical lens 84-2 is the light beam transmitted through the cylindrical lenses 81-2 and 82-2, and the light beam entering the cylindrical lens 84-3 is the light beam transmitted through the cylindrical lenses 81-3 and 82-3.

FIG. 16 shows the distribution of the light beams immediately before they enter the filter 85, and this is a view as observed from the right in FIG. 13. Each light beam has an intensity proportional to the shown value.

FIG. 17 is a schematic plan view of the filter 85, and this is a view as observed from the right in FIG. 13. The filter 85 is divided into twelve portions in the form of a matrix, and the light transmission factor of each portion is proportional to several elements of the matrices shown in equations (2) and (3), as shown. This filter 85 is for obtaining the C' signal. Also, as can be seen from FIG. 16, of the light beams entering the filter 85, two light beams proportional to cross terms CM, MY and YC appear while overlapping each other and therefore, in the filter 85, the position (indicated by hatching in FIG. 17) corresponding to one of them is shielded from light. The filter 85 can be made in the same manner as the filter 14 shown in FIG. 4. The light beams transmitted through the filter 85 are received by photodetectors 86-1, 86-2, ..., 86-12 disposed one by one rearwardly of the filter. As described above, the filter 85 is partly shielded from light and therefore, the photodetectors 86-6, 86-10 and 86-11 in FIG. 13 are actually unnecessary.

Here, let it be assumed that, of the elements of the matrices A and B, $a_{01}$, $b_{03}$ and $b_{04}$ are given the negative sign. The outputs of the photodetectors 86-1, 86-2, 86-4, 86-7, 86-9 and 86-12 are added together by an adder 87 and on the other hand, the outputs of the photodetectors 86-3, 86-5 and 86-8 are added together by an adder 88, and further, by inputting the adder 88 to an adder 89 and effecting subtraction, an output color signal which is $a_{00}C - a_{01}M + a_{02}Y + b_{00}C^2 + b_{01}M^2 + b_{02}Y^2 - b_{03}CM - b_{04}MY + b_{05}YC = C'$ is obtained from a signal line 90.

In a similar manner, the light transmission factor of each matrix element portion of the filter 85 is changed and the connection between each photodetector and the adders 87 and 88 is suitably set and the signal processing is carried out, whereby an M' output color signal and a Y' output color signal can be obtained.

FIG. 18 is a plan view of the filter in a sixth embodiment of the optical operation apparatus of the present invention. In the above-described fifth embodiment, there has been shown the type in which the C', M' and Y' signals are obtained discretely, whereas in the present embodiment, there is shown the type in which these output color signals are obtained at a time.

That is, in the apparatus of the present embodiment, as the filter 85 in FIG. 13, the filter shown in FIG. 18 is used instead of the filter as shown in FIG. 17 used in the above-described fifth embodiment. In this filter, the portion corresponding to each matrix element portion in FIG. 17 is divided into three parts, and the light transmission factors of these divided parts are proportional to the elements of the matrices shown in equations (2) and (3), as shown, and all matrix elements are related to the light transmission factors of these divided parts. A photodetector is disposed rearwardly of each of these divided parts and receives the light transmitted through the filter. The C' signal can be obtained by processing the output signal from the photodetector rearward of the divided part of the filter which corresponds to the matrix elements $a_{0i}$ (i=0, 1, 2) and $b_{0j}$ (j=0, 1, ..., 5) in the same manner as in the fifth embodiment, and the M' signal and the Y' signal can be obtained at a time by processing the output signals from the photodetectors rearward of the divided parts of the filter which correspond to the matrix elements $a_{1i}$ and $b_{1j}$ and further $a_{2i}$ and $b_{2j}$, in a similar manner.

Also, an optical fiber bundle may be provided rearwardly of the filter to cause the light beam transmitted through each divided part of the filter to enter the optical fiber and cause the light beam to enter the photodetector from the optical fiber. In this case, the other end portions of the optical fibers having one end thereof connected to the divided parts of the filter which correspond, for example, to the matrix elements $a_{00}$, $a_{02}$, $b_{00}$, $b_{01}$, $b_{02}$ and $b_{05}$ may be connected in a lump to a photodetector while, on the other hand, the other end portions of the optical fibers having one end thereof connected to the divided parts of the filter which correspond to the matrix elements $a_{01}$, $a_{03}$ and $b_{04}$ may be connected in a lump to another photodetector, and by subtracting the output signals of the two photodetectors, the C' signal can be obtained, and the M' signal and the Y' signal can be obtained in a similar manner. Thus, the number of necessary photodetectors can be greatly decreased.

According to the fifth and sixth embodiments, color compensation can be accomplished by the use of up to the second-order term, and the method and apparatus for this color compensation are relatively simple in construction and the processing speed does not essentially differ from that in the case of color compensation which uses up to the first-order term.

Figure 19A:
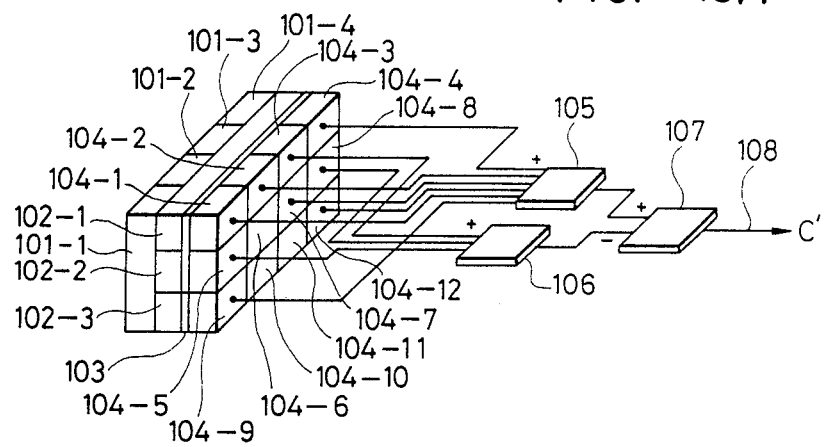
FIG. 19(A) is a schematic perspective view of a seventh embodiment of the present invention.
Figure 19B:
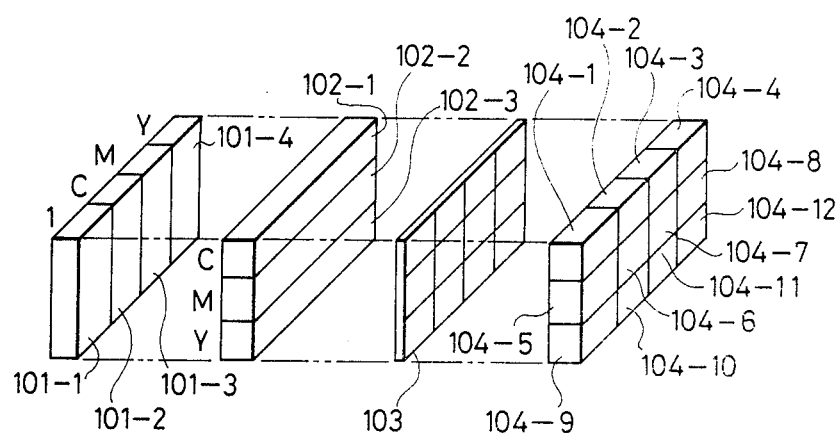
FIG. 19(B) is a partial exploded perspective view of the apparatus of FIG. 19(A).

Also, in the fifth and sixth embodiments, the LEDs may be made integral with one another, whereby an optical operation apparatus of simple and compact construction can be realized. FIG. 19(A) is a schematic perspective view of a seventh embodiment of the present invention, and FIG. 19(B) is a partial exploded perspective view thereof.

In FIG. 19, reference numerals 101-1, 101-2, 101-3 and 101-4 designate surface light emission type LEDs which are similar to those used in the third and fourth embodiments. Reference numerals 102-1, 102-2 and 102-3 denote space light modulators which may be, for example, PLZT light modulators or liquid crystal light modulators. These light modulators have an arrangement form orthogonal to the arrangement of said plurality of LEDs. Reference numeral 103 designates a matrix filter having each element of the matrices of equations (2) and (3) as the transmission factor. Reference numerals 104-1, 104-2, ..., 104-12 denote photodetectors disposed at positions corresponding to the matrix element portions of the matrix filter 103. Reference numerals 105, 106 and 107 designate adders, and reference numeral 108 denotes the output signal line from the adder 107.

The LEDs 101-1, 101-2, 101-3 and 101-4 emit lights of intensities proportional to 1 (i.e., unit intensity) and the signal intensities of the C signal, the M signal and the Y signal, respectively. The space light modulators 102-1, 102-2 and 102-3 have their light transmission factors varied in conformity with the C signal, the M signal and the Y signal, respectively, and thus, their light transmission factors become proportional to the C signal, the M signal and the Y signal.

The distribution of the light beams immediately after they have passed through the space light modulators is such as shown in FIG. 16, similarly to that in the fifth embodiment, and each light beam has an intensity proportional to the shown value. The matrix-like arrangement of twelve light beams thus formed corresponds to the arrangement of the twelve matrix element portions of the filter 103, and each light beam is caused to enter one of the matrix element portions of the filter 103.

The filter 103 may be one similar to that in the fifth embodiment shown in FIG. 17. Accordingly, the filter 103 is partly shielded from light and therefore, actually, the photodetectors 104-6, 104-10 and 104-11 in FIG. 19(B) are unnecessary.

Here, let it be assumed that, of the elements of the matrices A and B, $a_{01}$, $a_{03}$ and $b_{04}$ are given the negative sign. The outputs of the photodetectors 104-1, 104-2, 104-4, 104-7, 104-9 and 104-12 are added together by the adder 105 and, on the other hand, the outputs of the photodetectors 104-3, 104-5 and 104-8 are added together by the adder 106, and by inputting the output of the adder 105 and the output of the adder 106 to an adder 107 at the reverse sign and effecting subtraction, an output color signal which is $a_{00}C - a_{01}M + a_{02}Y + b_{00}C^2 + b_{01}M^2 + b_{02}Y^2 - b_{03}CM - b_{04}MY + b_{05}YC = C'$ is obtained from the signal line 108.

In a similar manner, the light transmission factor of each matrix element portion of the filter 103 is changed, the connection between each photodetector and the adders 105 and 106 is suitably set and the signal processing is carried out, whereby an M' output color signal and a Y' output color signal can be obtained.

Again in the present embodiment, as in the fifth embodiment, a modification using the filter as shown in FIG. 18 is possible.

In the above-described embodiments, color compensation using up to the second-order term is shown, but color compensation including the third-order and higher order terms can also be accomplished in a similar manner by additionally using a space light modulator, imparting to the light modulator a light transmission factor based on a color signal, suitably setting the optical path of each light beam and utilizing a suitable filter.

Also, in the above-described embodiments, space light modulators whose transmission factors are constant have been used to obtain light beams of an intensity corresponding to the second-order term of the operation, but by using electro-optical (hereinafter referred to as E/O) elements or acousto-optical (hereinafter referred to as A/O) elements as such modulators, operation becomes possible even when each term varies with time. Such example will hereinafter be described.

Figure 20:
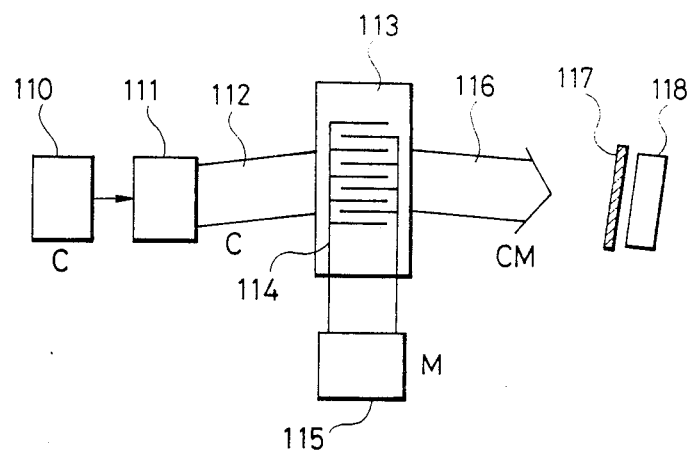
FIG. 20 is a schematic view illustrating the principle of operation of an E/O element usable in the present invention.

FIG. 20 illustrates the principle of operation of an E/O element usable in the present invention. In FIG. 20, reference numeral 111 designates a laser light source, reference numeral 110 denotes a power source for modulating the light source intensity of the laser light source 111, reference numeral 113 designates an E/O element, reference numeral 114 denotes a comb type electrode formed on the E/O element 113, reference numeral 115 designates a power source for modulating the E/O effect to apply a voltage to the comb type electrode 114, reference numeral 117 denotes an ND filter, and reference numeral 118 designates a light-receiving element.

Now, consider a case where the term of $b_{03}CM$ for obtaining C' in the aforementioned equation (1) is operated. By inputting the C signal to the power source 110, the voltage applied to the laser light source 111 is controlled and a laser beam 112 of an intensity proportional to the C signal is caused to enter the E/O element 113 from the laser light source 111. On the other hand, by inputting the M signal to the power source 115, the voltage applied to the comb type electrode 114 is controlled to cause the E/O element to produce an E/O effect proportional to the M signal. Thus, the intensity of the light beam diffracted in the E/O element 113 by the E/O effect becomes proportional to the M signal. Accordingly, the diffracted emergent light beam 116 from the E/O element 113 has an intensity proportional to the product (CM) of the C signal and the M signal. On the other hand, a transmission factor corresponding to the coefficient $b_{03}$ in said equation is imparted to the filter 117. When the emergent light beam 116 from the E/O element is caused to enter the light-receiving element 118 through the filter 117, a light beam of an intensity proportional to $b_{03}CM$ enters the light-receiving element 118. Thus, a signal $b_{03}CM$ is put out from the light-receiving element 118.

By inputting one of 1 (unit signal), the C signal, the M signal and the Y signal to the power sources 110 and 115 in a similar manner and making the transmission factor of the filter 117 correspond to one of the coefficients $a_{00}$–$a_{33}$ and $b_{00}$–$b_{25}$ of said equation which is suitably selected, the signals of the first-order and second-order terms in equation (1) are put out from the light-receiving element 118.

Figure 21:
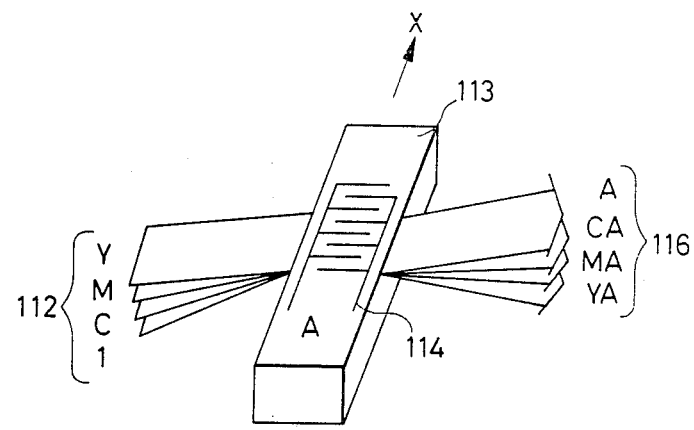
FIG. 21 is a perspective view showing another function of the E/O element used in the present invention.

FIG. 21 is a perspective view illustrating another function of the E/O element used in the apparatus of the present invention. A plurality of light beams as the incident light beam 112 are caused to enter the E/O element 113 so that the angles of incidence thereof in a vertical plane (i.e., in a plane perpendicular to the pitch direction X of the comb type electrode 114 in FIG. 21) differ from each other, and a plurality of light beams as the emergent light beam 116 are obtained from the E/O element 113 so that the angles of emergence thereof in the vertical plane differ from each other. If, as shown, four light beams of intensities proportional to 1, the C signal, the M signal and the Y signal are used as the incident light beam 112 and the intensity of the E/O effect obtained by the comb type electrode 114 is made proportional to a signal A input to the power source 115, four light beams proportional to A, CA, MA and YA are obtained as the emergent light beam 116 at a time. If the C signal, the M signal or the Y signal is used as the signal A, the signals of the first-order and second-order terms in equation (1) can be obtained.

Figure 22:
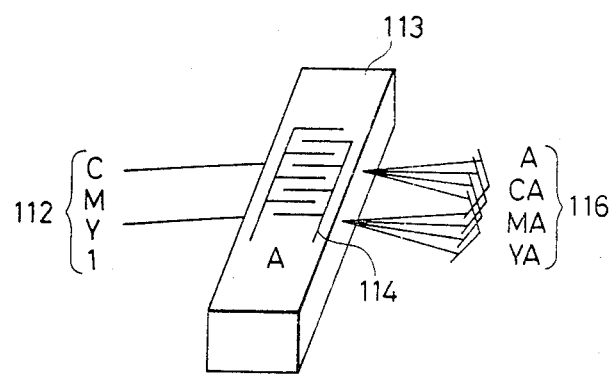
FIG. 22 is a perspective view showing still another function of the E/O element used in the present invention.

FIG. 22 is a perspective view illustrating still another function of the E/O element used in the apparatus of the present invention. A light beam comprising multiplex laser light of different wavelengths is used as the incident light beam 112. That is, laser light of four wavelengths are modulated to intensities proportional to the I, C, M and Y signals and superposed one upon another to obtain the incident light beam 112. The laser light of respective wavelengths has, for each wavelength, a different angle of diffraction within the E/O element 113 and therefore, the emergent light beams 116 comprising four light beams different in the angle of emergence in a horizontal plane is obtained. By making the intensity of the E/O effect obtained by the comb type electrode 114 similar to that in the case of FIG. 21, the emergent light beams 116 become proportional to A, CA, MA and YA. Accordingly, as in the case of FIG. 21, the signals of the first-order and second-order terms in equation (1) can be obtained.

Figure 23:
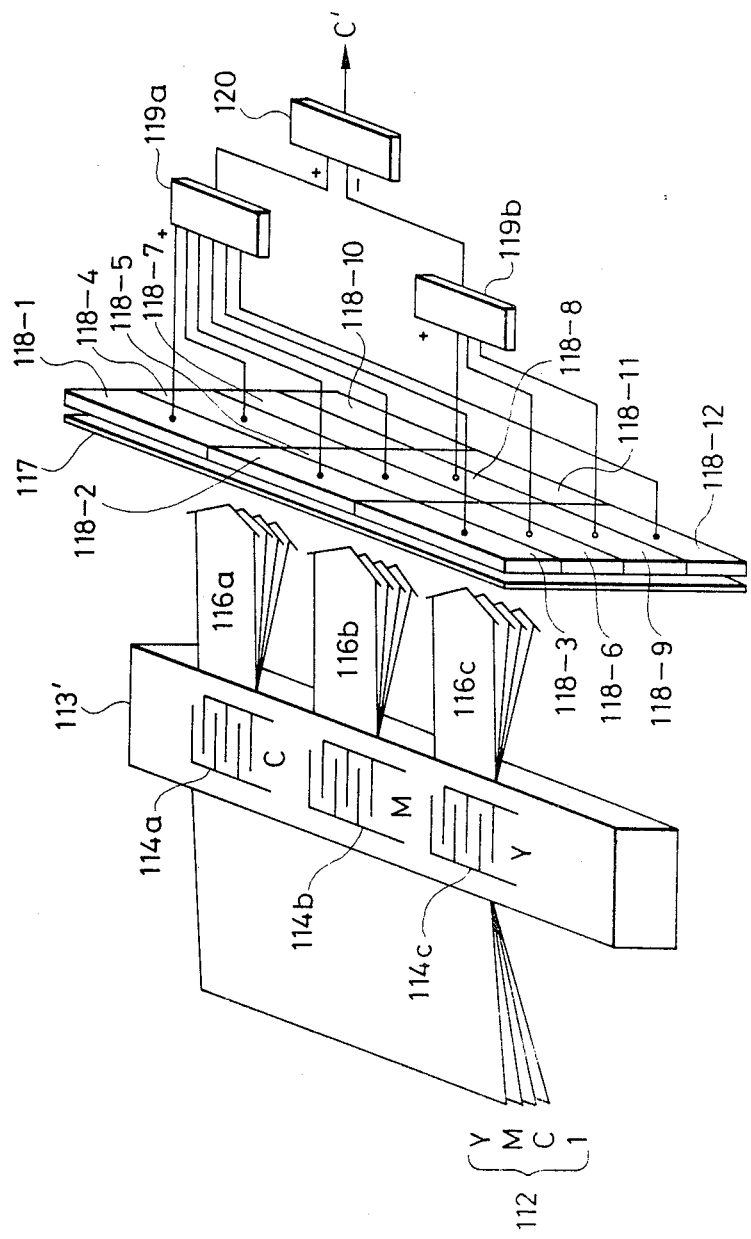
FIG. 23 is a partial schematic perspective view of an eighth embodiment of the present invention.

FIG. 23 is a partial schematic perspective view for illustrating the operation of an eighth embodiment of the present invention which uses the above-described E/O element. In the present embodiment, use is made of an E/O modulating element 113' comprising three E/O modulating elements shown in FIG. 21 which are jurtaposed. That is, the E/O element 113' is provided with three comb type electrodes 114a, 114b and 114c, and the C signal, the M signal and the Y signal are input to the power sources, respectively, for the respective electrodes. Accordingly, when an incident light beam 112 comprising four light beams is caused to enter the E/O element 113', emergent light beams 116a, 116b and 116c each comprising four light beams emerge from positions corresponding to the comb type electrodes 114a, 114b and 114c.

In FIG. 23, reference numeral 117 designates an ND filter. FIG. 24 shows the distribution of the light beams entering the ND filter 117. This is a view as observed from the right in FIG. 23. Each light beam has an intensity proportional to the shown value. FIG. 25 is a plan view of the ND filter 117, and this is a view as observed from the right in FIG. 23. The filter 117 is divided into twelve portions in the form of a matrix, and the light transmission factor of each portion is proportional to several of the coefficients of said equation as shown. The filter 117 is for obtaining the C' signal. As can be seen from FIG. 24, of the light beams entering the filter 117, two light beams proportional to cross terms CM, MY and YC appear while overlapping each other and therefore, in the filter 117, the position (indicated by hatching in FIG. 25) corresponding to one of them is shielded from light.

In FIG. 23, reference numerals 118-1, 118-2, . . . , 118-12 designate light-receiving elements, each of which is disposed at a position corresponding to one of the matrix element portions of the ND filter 117. Accordingly, the light beams transmitted through the ND filter 117 enter the corresponding light-receiving elements for the respective matrix element portions. Since the filter 117 is partly shielded from light as described above, actually the light-receiving elements 118-7, 118-10 and 118-11 in FIG. 23 are unnecessary. FIG. 26 shows the distribution of the light beams immediately after they have been transmitted through the ND filter 117, that is, immediately before they enter the light-receiving elements, and this is a view as observed from the right in FIG. 23. Each light beam has an intensity proportional to the shown value.

Here, let it be assumed that, of the coefficients of said equation, $b_{01}$, $b_{04}$ and $b_{05}$ are given the negative sign.

The outputs of the light-receiving elements 118-1, 118-2, 118-3, 118-4, 118-5 and 118-12 are added together by an adder 119a, and on the other hand, the outputs of the light-receiving elements 118-6, 118-8 and 118-9 are added together by an adder 119b, and by inputting the outputs of these adders 119a and 119b to an adder 120 at the reverse sign and effecting subtraction, an output color signal which is $a_{00}C - a_{01}M + a_{02}Y + b_{00}C^2 + b_{01}M^2 + b_{02}Y^2 - b_{03}CM - b_{04}MY + b_{05}YC = C'$ is obtained from the adder 120.

By changing the light transmission factor of each matrix element portion of the filter 117 in a similar manner, suitably setting the connection between each light-receiving element and the adders 119a and 119b and effecting the signal processing, an M' output color signal and a Y' output color signal can be obtained.

FIG. 27 is a partial plan view of the filter in a modification of the above-described eighth embodiment. In the above-described embodiment, there is shown the type in which the C' signal, the M' signal and the Y' signal are obtained discretely, while in the present example, there is shown the type in which these output color signals are obtained at a time.

That is, in the present example, as the filter 117 in FIG. 23, the filter shown in FIG. 27 is used instead of the filter as shown in FIG. 25 which has been used in the above-described embodiment. In this filter, the portions thereof corresponding to the matrix element portions in FIG. 25 are each divided into three parts, and the light transmission factors of these divided parts are proportional to the coefficient in said equation, as shown, and all coefficients up to the second-order term with respect to C, M and/or Y in said equation are related to the light transmission factors of these divided parts. A light-receiving element is disposed rearwardly of each of these divided parts and receives the light transmitted through the filter. The C' signal can be obtained by processing the output signals from the light-receiving elements rearward of the divided parts of the filter corresponding to the coefficients $a_{0i}$ (i=0, 1, 2) and $b_{0j}$ (j=0, 1, ..., 5) in the same manner as in the above-described embodiment, and the M' signal and the Y' signal can be obtained at a time by processing the output signals from the light-receiving elements rearward of the divided parts of the filter corresponding to the coefficients $a_{1i}$ and $b_{1j}$ and further, $a_{2i}$ and $b_{2j}$ in a similar manner.

In the embodiment of FIG. 23, four light beams proportional to the 1, C, M and Y signals are caused to enter at different angles of incidence as the incident light beam 112 and the E/O effect proportional to the C, M and Y signals is produced by the three comb type electrodes of the E/O element, but conversely, four comb type electrodes may be provided on the E/O element and the E/O effect proportional to the 1, C, M and Y signals may be produced by these electrodes and three light beams proportional to the C, M and Y signals may be caused to enter at different angles of incidence as the incident light beam 112, whereby a similar operation can be obtained.

Also, a similar operation can be obtained by the multiplex light beams as shown in FIG. 22 being used as the incident light beam 112 in the embodiment of FIG. 23.

Also, by arranging the E/O elements as shown in FIG. 21 or 22 in series in multiple stages, an operation including the third-order and higher order terms with respect to C, M and/or Y in said equation can be accomplished. In this case, the grating pitch direction of each E/O modulating element can be suitably set in conformity with the direction in which the output light beam is taken out.

Further, by additionally using a space light modulator, imparting to this light modulator a light transmission factor based on a color signal, suitably setting the optical path of each light beam and further utilizing a suitable filter, color compensation including the third-order and higher order terms can also be accomplished in a similar manner.

Also, even if an A/O element is used similarly to the previously described E/O element, the optical operation apparatus of the present invention can be constructed.

Figure 28:
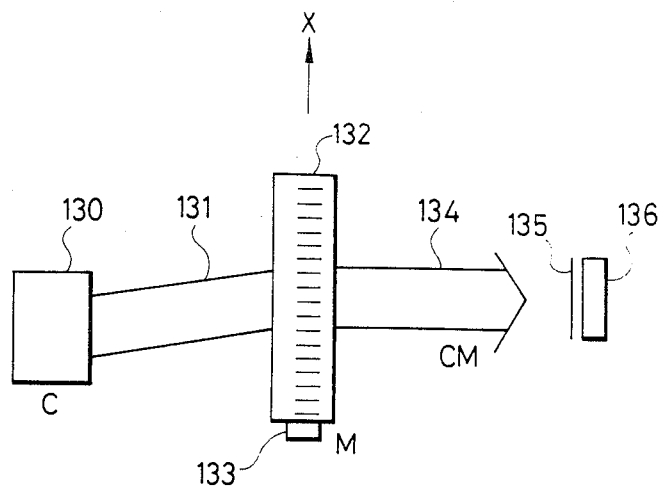
FIG. 28 is a schematic view illustrating the principle of operation of an A/O element usable in the present invention.

FIG. 28 illustrates the principle of operation of an A/O element usable in the present invention. In FIG. 28, reference numeral 130 designates a laser light source, reference numeral 132 denotes an A/O element, reference numeral 133 designates a piezo-electric element provided on the A/O element 132, reference numeral 135 denotes an ND filter, and reference numeral 136 designates a light-receiving element.

Now, suppose a case where the term of $b_{03}CM$ for obtaining C' in equation (1) is operated. By applying to the light source 130 a voltage based on the C signal, a laser beam 131 of an intensity proportional to the C signal is caused to enter the A/O element 132 from the light source 130. On the other hand, by applying to the piezo-electric element 133 a voltage based on the M signal, an elastic wave of an intensity proportional to the M signal is produced in the A/O element 132. This elastic wave travels in the direction of arrow X, and a grating having its pitch direction in X direction is formed in the A/O element 132. Thus, the intensity of the light beam diffracted in the A/O element 132 by the grating becomes proportional to the M signal. Accordingly, the diffracted emergent light beam 134 from the A/O element 132 has an intensity proportional to the product (CM) of the C signal and the M signal. On the other hand, a light transmission factor corresponding to the coefficient $b_{03}$ in equation (1) is imparted to the filter 135. When the emergent light beam 134 from the A/O element is caused to enter the light-receiving element 136 through the filter 135, a light beam of an intensity proportional to $b_{03}CM$ enters the light-receiving element 136. Thus, a signal $b_{03}CM$ is put out from the light-receiving element 136.

By applying to the light source 130 and the piezo-electric element 133 a voltage based on one of the 1 (unit signal), C, M and Y signals and making the transmission factor of the filter 135 correspond to one of the coefficients $a_{00}$–$a_{33}$ and $b_{00}$–$b_{25}$ of equation (1) which has been suitably selected, the signals of the first-order and second-order terms in said equation are put out from the light-receiving element 136.

Figure 29:
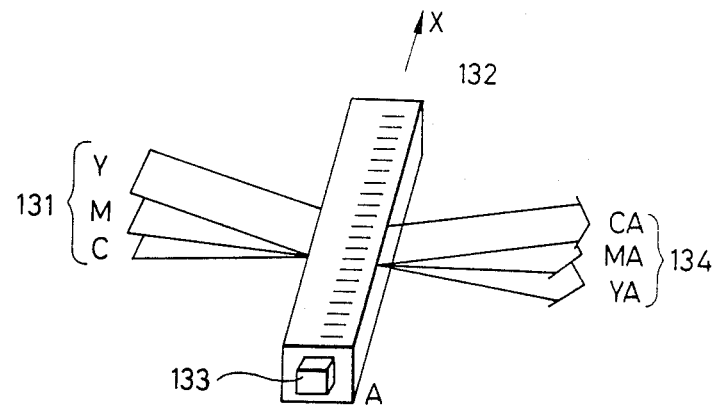
FIG. 29 is a perspective view showing another function of the A/O element used in the present invention.

FIG. 29 is a perspective view illustrating another function of the A/O element used in the apparatus of the present invention. A plurality of light beams as the incident light beam 131 are caused to enter the A/O element 132 so that the angles of incidence thereof in a vertical plane (i.e., in a plane perpendicular to the pitch direction X of the grating in FIG. 29) differ from one another, and a plurality of light beams as the emergent light beam 134 are obtained from the A/O element 132 so that the angles of emergence thereof in the vertical plane differ from one another. When, as shown, three light beams of intensities proportional to the C, M and Y signals are used as the incident light beam 131 and a voltage based on the signal A is applied to the piezo-electric element 133, four light beams proportional to CA, MA and YA are obtained as the emergent light beam 134 at a time. If the 1, C, M or Y signal is used as the signal A, the signals of the first-order and second-order terms in said equation can be obtained.

Figure 30:
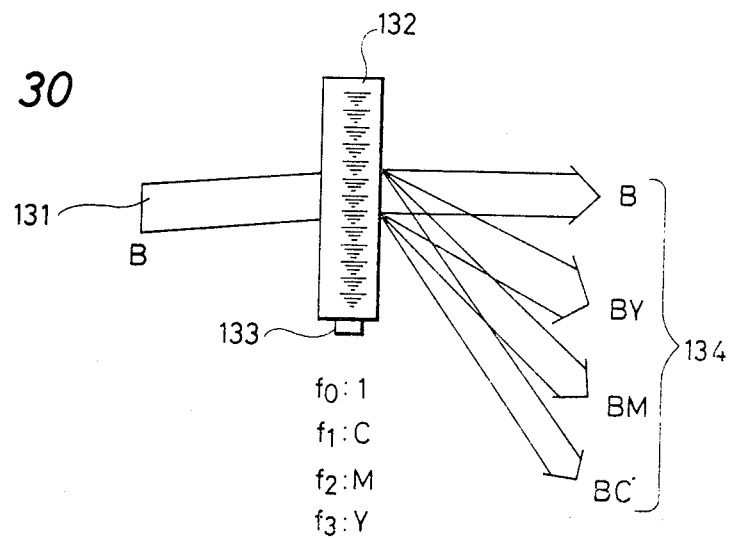
FIG. 30 is a perspective view showing still another function of the A/O element used in the present invention.

FIG. 30 is a perspective view illustrating another function of the A/O element used in the apparatus of the present invention. In applying a high frequency voltage to the piezo-electric element 133, use is made of a high frequency comprising different multiplex high frequencies. That is, as shown, four different high frequencies $f_0$, $f_1$, $f_2$ and $f_3$ are modulated on the basis of the 1, C, M and Y signals, respectively, and superposed one upon another and input to the piezo-electric element 133. A composite grating having four different pitches corresponding to said frequencies is formed in the A/O element 132, and the incident light beam 131 is divisionally diffracted at four different angles of diffraction by the grating, whereby an emergent light beam 134 comprising four light beams is obtained. If, as shown, a light beam of an intensity proportional to a signal B is used as the incident light beam 131, four light beams proportional to B, BY, BM and BC are obtained as the emergent light beam 134 at a time. If the C, M or Y signal is used as the signal B, the signals of the first-order and second-order terms in equation (1) can be obtained.

Figure 31:
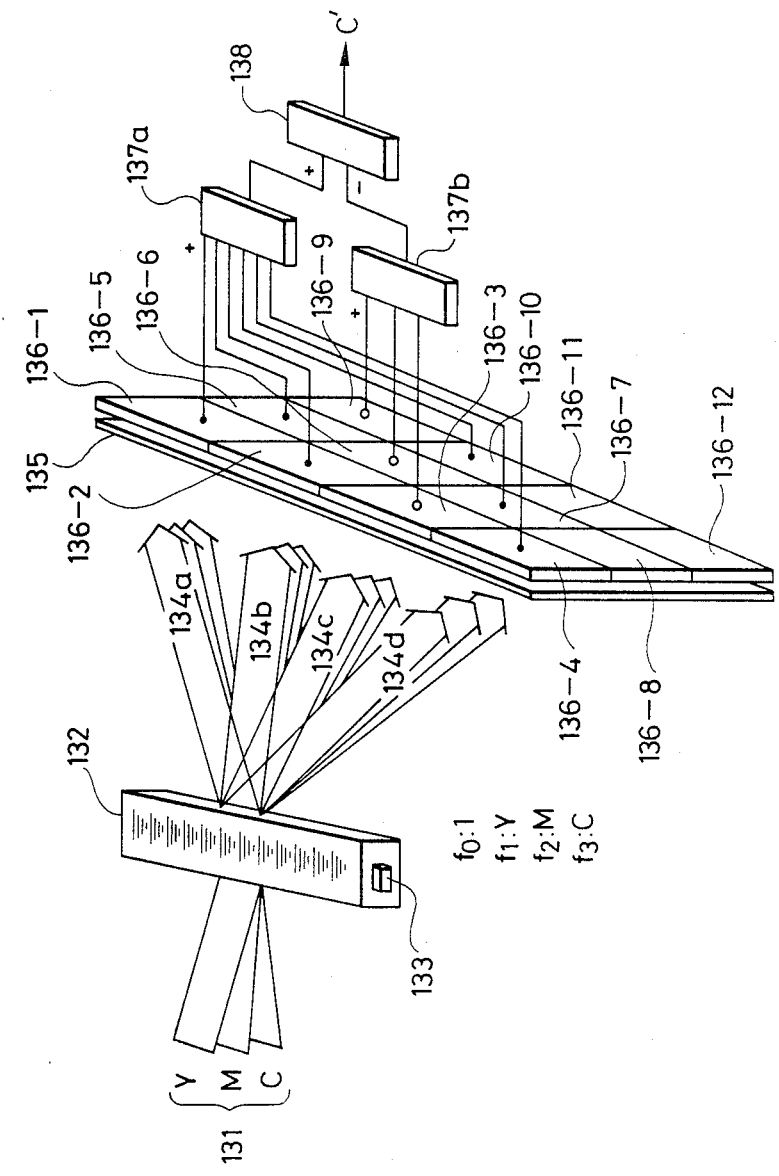
FIG. 31 is a partial schematic perspective view of a ninth embodiment of the present invention.

FIG. 31 is a partial schematic perspective view for illustrating the operation of a ninth embodiment of the present invention using the above-described A/O element. In the present embodiment, use is made of a system comprising a combination of the A/O modulation systems shown in FIGS. 29 and 30. That is, the incident light beam 131 comprises three light beams having intensities proportional to the C, M and Y signals, respectively, and a voltage comprising multiplex high frequencies $f_0$, $f_1$, $f_2$ and $f_3$ modulated on the basis of the 1, C, M and Y signals is applied to the piezo-electric element 133. Accordingly, emergent light beams 134a, 134b, 134c and 134d each comprising three light beams are caused to emerge from the A/O element 132.

In FIG. 31, reference numeral 135 designates an ND filter. FIG. 32 shows the distribution of the light beams entering the ND filter 135, and this is a view as observed from the right in FIG. 31. Each light beam has an intensity proportional to the shown value. FIG. 33 is a plan view of the ND filter 135, and this is a view as observed from the right in FIG. 31. The filter 135 is divided into twelve portions in the form of a matrix, and the light transmission factor of each portion is proportional to several of the coefficients of equation (1), as shown. This filter 135 is for obtaining the C' signal. Also, as can be seen from FIG. 32, of the light beams entering the filter 135, two light beams proportional to cross terms CM, MY and YC appear while overlapping each other and therefore, in the filter 135, the position (indicated by hatching in FIG. 33) corresponding to one of them is shielded from light.

In FIG. 31, reference numerals 136-1, 136-2, ..., 136-12 designate light-receiving elements. These light-receiving elements are disposed at positions corresponding to the matrix element portions of the ND filter 135 and accordingly, the light beam transmitted through the ND filter 135 enters the corresponding light-receiving element for each matrix element portion. Since the filter 135 is partly shielded from light as described above, actually the light-receiving elements 136-8, 136-11 and 136-12 in FIG. 31 are unnecessary.

FIG. 34 shows the distribution of the light beams immediately after they have been transmitted through the ND filter 135, that is, immediately before they enter the light-receiving elements, and this is a view as observed from the right in FIG. 31. Each light beam has an intensity proportional to the shown value.

Here, let it be assumed that, of the coefficients of equation (1), $a_{02}$, $a_{03}$ and $b_{04}$ are given the negative sign. The outputs of the light-receiving elements 136-1, 136-2, 136-4, 136-5, 136-7 and 136-10 are added together by an adder 137a, and on the other hand, the outputs of the light-receiving elements 136-3, 136-6 and 136-9 are added together by an adder 137b, and by inputting the outputs of these adders 137a and 137b to an adder 138 at the reverse sign and effecting subtraction, an output color signal which is $a_{00}C + a_{01}M - a_{02}Y + b_{00}C^2 + b_{01}M^2 + b_{02}Y^2 - b_{03}CM - b_{04}MY + b_{05}YC = C'$ is obtained from the adder 138.

By changing the light transmission factor of each matrix element portion of the filter 135 in a similar manner, suitably setting the connection between each light-receiving element and the adders 137a and 137b and effecting the signal processing, an M' output color signal and a Y' output color signal can be obtained.

FIG. 35 is a fragmentary plan view of the filter in a modification of the ninth embodiment. In the above-described embodiment, there is shown the type in which the C', M' and Y' signals are obtained discretely, but in the present example, there is shown the type in which these output color signals are obtained at a time. That is, in the present example, as the filter 135 in FIG. 31, the filter shown in FIG. 35 is used instead of the filter as shown in FIG. 33 which has been used in the above-described embodiment. In this filter, the portion thereof corresponding to each matrix element portion in FIG. 33 is divided into three parts, and the light transmission factors of these divided parts are proportional to the coefficients in said equation, as shown, and all coefficients up to the second-order term with respect to C, M and/or Y in said equation are related to the light transmission factors of these divided parts. A light-receiving element is disposed rearwardly of each of these divided parts and receives the light transmitted through the filter. By processing the output signals from the light-receiving elements rearward of the divided parts of the filter corresponding to the coefficients $a_{0i}$ (i=0, 1, 2) and $b_{0j}$ (j=0, 1, ..., 5) in the same manner as in the above-described embodiment, the C' signal can be obtained, and by processing the output signals from the light-receiving elements rearward of the divided parts of the filter corresponding to the coefficients $a_{1i}$ and $b_{1j}$ and further, $a_{2i}$ and $b_{2j}$ in a similar manner, the M' signal and the Y' signal can be obtained at a time.

In the embodiment of FIG. 31, as the incident light beam 131, three light beams proportional to the C, M and Y signals are caused to enter at different angles of incidence and as the high frequency voltage applied to the piezo-electric element 133, use is made of a voltage comprising multiplex frequencies $f_0$, $f_1$, $f_2$ and $f_3$, but a similar operation can also be obtained by using a voltage comprising multiplex frequencies $f_1$, $f_2$ and $f_3$ as the high frequency voltage applied to the piezo-electric element 133, modulating the light beams on the basis of the C, M and Y signals, respectively, correspondingly to the respective frequencies and causing four light beams proportional to the 1, C, M and Y signals to enter as the incident light beam 131 at different angles of incidence.

Alternatively, a construction may be adopted in which, instead of the plurality of light beams having different angles of incidence in the above-described embodiment, a light beam comprising multiplex light beams of different wavelengths is caused to enter and diffracted lights in different directions are obtained.

Figure 36:
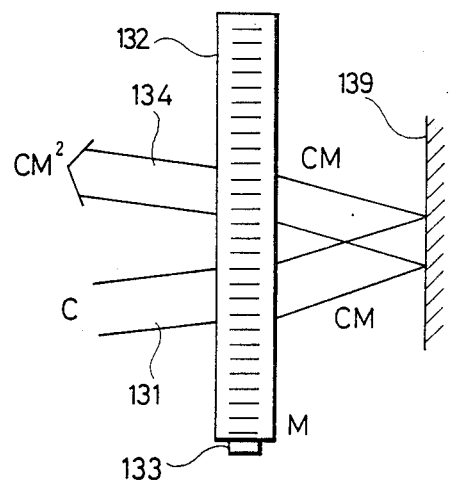
FIG. 36 is a schematic plan view showing another modification of the apparatus shown in FIG. 31

Also, by arranging the A/O elements of FIGS. 29 or 30 in series and in multiple stages, an operation including the third-order and higher order terms with respect to C, M and/or Y in said equation can be accomplished. In this case, the direction of travel of the elastic wave of each A/O modulation element can be suitably set in conformity with the direction in which the output light beam is taken out. At this time, as shown in FIG. 36, the emergent light beam from the A/O element 132 is caused to be reflected by a reflecting mirror 139 and again enter the A/O element 132, whereby the operation of high-order terms can be accomplished. In this case, the number of the A/O elements used can be decreased.

Further, by additionally using a space light modulator, imparting to this light modulator a light transmission factor based on a color signal, suitably setting the optical path of each light beam and utilizing a suitable filter, color compensation including the third-order and higher order terms can also be accomplished in a similar manner.

In the present invention, a more compact optical operation apparatus can be realized by combining a thin film light waveguide with the construction as described above. Such an embodiment will hereinafter be described.

Figure 37:
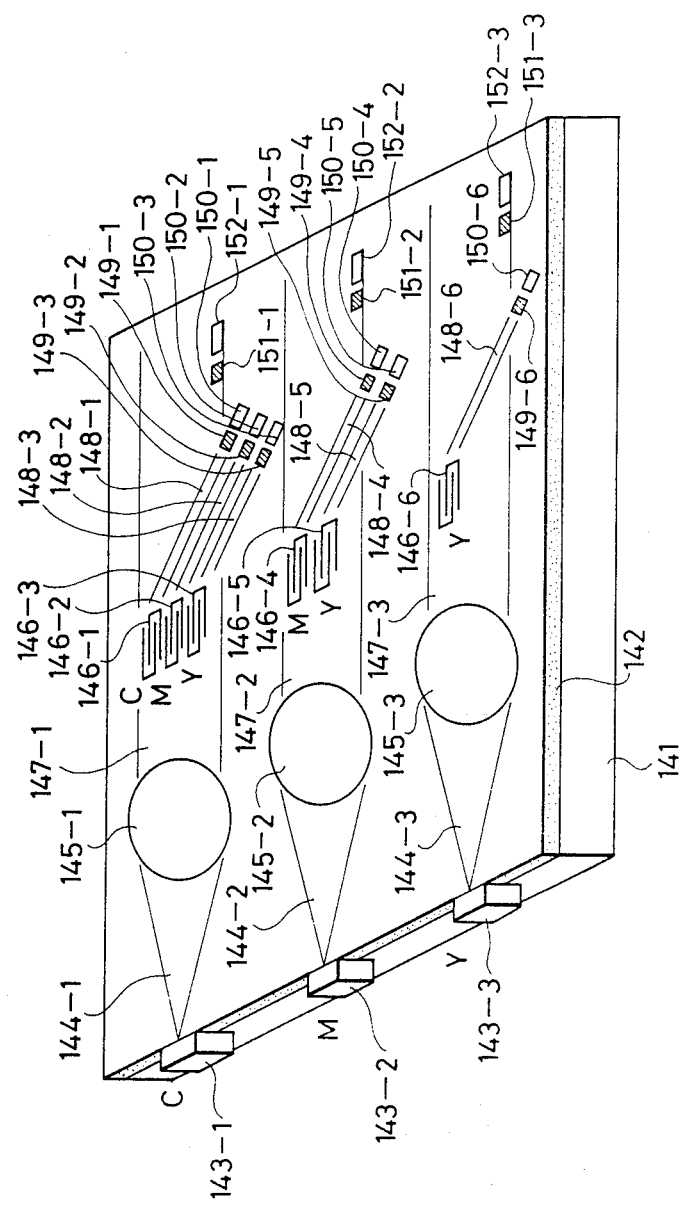
FIG. 37 is a schematic partial perspective view showing a tenth embodiment of the present invention.

FIG. 37 is a schematic partial perspective view showing a tenth embodiment of the optical operation apparatus of the present invention.

In FIG. 37, reference numeral 141 designates a base plate and reference numeral 142 denotes a thin film light waveguide formed on the surface of the base plate 141. The base plate 141 may be crystal having the electro-optical effect such as Y-cut $LiNbO_3$ or $LiTaO_3$, and the light waveguide 142 is formed as a thin film having a higher refractive index than the crystal base plate by evaporating Ti on the surface of the crystal base plate and heat-diffusing the Ti in the crystal base plate. Alternatively, a plate of glass or alumina may be used as the base plate 141 and a thin film of a material having the electro-optical effect such as ZnO may be formed on the base plate 141 and this thin film can be utilized as the light waveguide 142.

Reference numerals 143-1, 143-2 and 143-3 designate semiconductor laser light sources, and the C signal, the M signal and the Y signal are input to these laser light sources, respectively. The laser light sources 143-1, 143-2 and 143-3 are coupled to the base plate 141 and the light waveguide 142 so that the light beams emitted therefrom are propagated through the light waveguide 142. At positions whereat the light beams 144-1, 144-2 and 144-3 emitted from the laser sources 143-1, 143-2 and 143-3, respectively, and propagated through the light waveguide 142 pass, there are formed waveguide lenses 145-1, 145-2 and 145-3, respectively. These waveguide lenses are, for example, geodesic lenses, Luneburg lenses or grating lenses.

Reference numerals 146-1, 146-2, 146-3, 146-4, 146-5 and 146-6 designate comb type electrodes formed on the light waveguide 142. The comb type electrodes 146-1, 146-2 and 146-3 are positioned at an area into which a light beam 147-1 collimated by the lens 145-1 enters, and are arranged so that the arrangement pitch direction of the combs of the electrodes is substantially orthogonal to the direction of travel of the light beam 147-1. The comb type electrodes 146-4 and 146-5 and 146-6 are positioned at an area into which a light beam 147-2 collimated by the lens 145-2 enters, and are arranged so that the arrangement pitch direction of the combs of the electrodes is substantially orthogonal to the direction of travel of the light beam 147-2. The comb type electrode 146-6 is positioned at an area into which a light beam 147-3 collimated by the lens 145-3 enters, and is arranged so that the arrangement pitch direction of the comb of the electrode is substantially orthogonal to the direction of travel of the light beam 147-3. These comb type electrodes can be made by evaporating aluminum on the light waveguide 142, and then forming a desired pattern by the use of the photolithography technique. To reduce the loss of the quantity of light of the light beam propagated through the light waveguide 142 below these comb type electrodes, it is preferable to form a buffer layer of $SiO_2$ having a thickness of 1500 Å between the light waveguide 142 and the aluminum comb type electrodes. The C signal is input to the comb electrode 146-1, the M signal is input to the comb type electrodes 146-2 and 146-4, and the Y signal is input to the comb type electrodes 146-3, 146-5 and 146-6.

By voltages based on the respective signals being applied to the comb type electrodes, a periodical variation in refractive index having a pitch in a direction substantially orthogonal to the direction of travel of the light beam is produced in the light waveguide 142 by the electro-optical effect, and this acts on the light beam as a phase diffraction grating. The intensity of this electro-optical effect is proportional to each signal.

Reference numerals 148-1, 148-2, 148-3, 148-4, 148-5 and 148-6 designate diffracted light beams diffracted by the diffraction gratings created by the comb type electrodes 146-1, 146-2, 146-3, 146-4, 146-5 and 146-6. Light attenuators 149-1, 149-2, 149-3, 149-4, 149-5 and 149-6 are provided at areas whereat the diffracted light beams arrive, and photodetectors 150-1, 150-2, 150-3, 150-4, 150-5 and 150-6 are provided rearwardly of the light attenuators with respect to the direction of travel of the diffracted light beams. The light attenuators can be formed by disposing a material having a high refractive index and a light absorbing property such as $TiO_2$ or $Ta_2O_5$ on the light waveguide 142, and instead of such material, use may also be made of a metal film formed on the light waveguide 142 as by evaporation. The light transmission factors of the light attenuators 149-1, 149-2, 149-3, 149-4, 149-5 and 149-6 are proportional to $b_{00}$, $b_{03}$, $b_{05}$, $b_{01}$, $b_{04}$ and $b_{02}$, respectively. The photodetectors may be ones using, for example, amorphous silicon as opto-electromotive force elements, and the light-receiving portions thereof may be obtained by forming an amorphous silicon layer on the light waveguide 142.

Reference numerals 151-1, 151-2 and 151-3 designate light attenuators similar to said light attenuator 149-1, but these light attenuators are positioned at areas into which, of the light beams 147-1, 147-2 and 147-3, the light beams having not passed below the comb type electrodes 146-1, 146-2, 146-3, 146-4, 146-5 and 146-6 enter. The light transmission factors of these light attenuators 151-1, 151-2 and 151-3 are proportional to $a_{00}$, $a_{01}$ and $a_{02}$, respectively. Photodetectors 152-1, 152-2 and 152-3 are provided rearwardly of the light attenuators 151-1, 151-2 and 151-3, respectively, with respect to the direction of travel of the light beams 147-1, 147-2 and 147-3. These photodetectors are similar to said photodetector 150-1.

The light waveguide type operation apparatus shown in FIG. 37 is for executing the operation of the aforementioned equation (1).

Lights of intensities proportional to the C signal, the M signal and the Y signal, respectively, are emitted from the semiconductor laser light sources 143-1, 143-2 and 143-3. These lights are directed into the light waveguide 142 by a bat coupling and become light beams 144-1, 144-2 and 144-3. These light beams are propagated through the light waveguide 142 while repeating frequent total reflection by the interface with the atmosphere and the interface with the base plate 141, and arrive at lenses 145-1, 145-2 and 145-3, respectively. The lenses 145-1, 145-2 and 145-3 have substantially the same characteristic and are disposed so that the distances between the light sources 143-1, 143-2, 143-3 and the lenses 145-1, 145-2, 145-3 are substantially equal to one another. Moreover, the lenses 145-1, 145-2 and 145-3 are arranged so that light beams 147-1, 147-2 and 147-3 emerging therefrom are substantially parallel to one another.

Voltages proportional to the C, M, Y, M, Y and Y signals are applied to comb type electrodes 146-1, 146-2, 146-3, 146-4, 146-5 and 146-6, whereby diffraction gratings of intensities substantially proportional to the respective signals are formed in the light waveguide 142 below the comb type electrodes and accordingly, the intensities of light beams 148-1, 148-2, 148-3, 148-4, 148-5 and 148-6 diffracted by the comb type electordes are substantially proportional to $C^2$, CM, CY, $M^2$, MY and $Y^2$, respectively. Of course, the intensities of light beams 147-1, 147-2 and 147-3 are proportional to C, M and Y, respectively.

Thus, the intensities of lights transmitted through the light attenuators 149-1, 149-2, 149-3, 149-4, 149-5, 149-6, 151-1, 151-2 and 151-3 and entering the photodetectors 150-1, 150-2, 150-3, 150-4, 150-5, 150-6, 152-1, 152-2 and 152-3 are substantially proportional to $b_{00}C^2$, $b_{03}CM$, $b_{05}YC$, $b_{01}M^2$, $b_{04}MY$, $b_{02}Y^2$, $a_{00}C$, $a_{01}M$ and $a_{02}Y$, respectively, and accordingly, outputs proportional to these are obtained from the respective photodetectors.

To obtain C' of equation (1), the outputs of the photodetectors may be added together, but actually subtraction must also be effected because some of the coefficients of the respective terms are negative.

Figure 38:
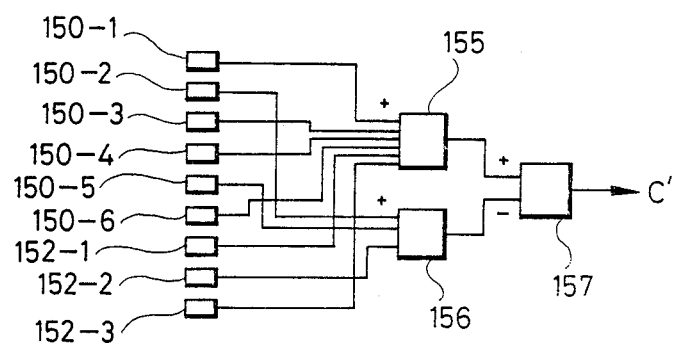
FIG. 38 is a block diagram of a signal processing circuit in the apparatus shown in FIG. 37.

FIG. 38 is a block diagram showing a signal processing circuit for executing such addition and subtraction.

Now, let it be assumed that, of the elements of the matrices A and B, $a_{01}$, $b_{03}$ and $b_{04}$ are given the negative sign. The outputs of the photodetectors 150-1, 150-3, 150-4, 150-6, 152-1 and 152-3 are added together by an adder 155, and on the other hand, the outputs of the photodetectors 150-2, 150-5 and 152-2 are added together by an adder 156, and by inputting the output of the adder 155 and the output of the adder 156 to an adder 157 at the reverse sign and effecting subtraction, an output color signal which is $a_{00}C - a_{01}M + a_{02}Y + b_{00}C^2 + b_{01}M^2 + b_{02}Y^2 - b_{03}CM - b_{04}MY + b_{05}YC = C'$ is obtained.

The apparatus for obtaining the C' signal has been described above, and the M' signal and the Y' signal can be obtained in a similar manner by preparing the elements as shown in FIG. 37 for the M' signal and the Y' signal, respectively, suitably setting the transmission factor of each attenuator and suitably setting the connection of the signal processing circuit as shown in FIG. 38.

Figure 39:
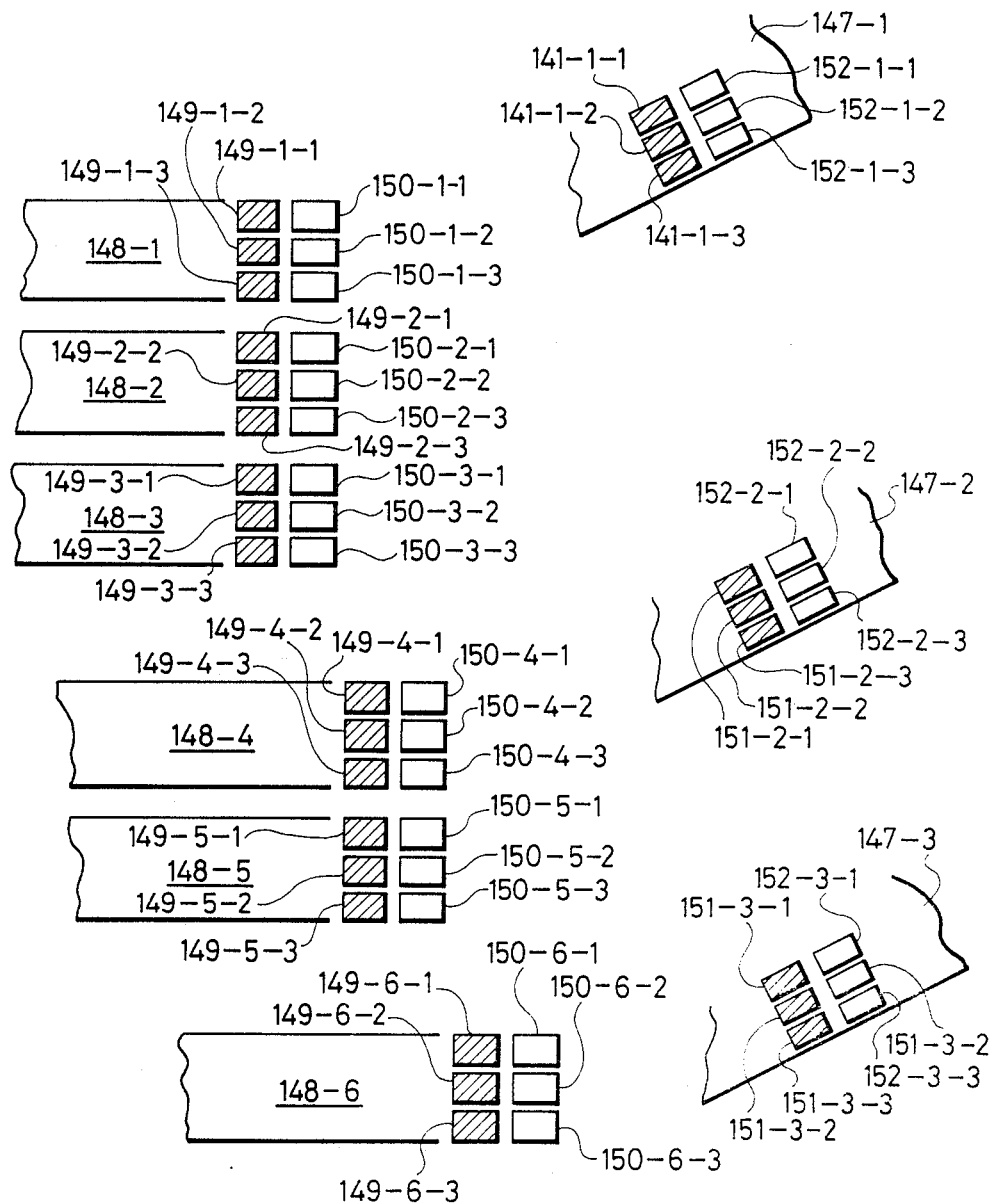
FIG. 39 is a schematic fragmentary plan view showing a modification of the detecting portion of the apparatus shown in FIG. 37.

FIG. 39 is a schematic fragmentary plan view showing a modification of the detecting portion of the embodiment shown in FIG. 37.

The modification of FIG. 39 differs from the embodiment of FIG. 37 only in that three light attenuators are parallel-arranged at areas into which diffracted light beams 148-1, 148-2, 148-3, 148-4, 148-5 and 148-6 and light beams 147-1, 147-2 and 147-3 enter and photodetectors are independently disposed rearwardly of the light attenuators, respectively, with respect to the direction of travel of the light beams. The light transmission factors of light attenuators 149-1-1, 149-2-1, 149-3-1, 149-4-1, 149-5-1, 149-6-1, 151-1-1, 151-2-1 and 151-3-1 are proportional to $b_{00}$, $b_{03}$, $b_{05}$, $b_{01}$, $b_{04}$, $b_{02}$, $a_{00}$, $a_{01}$ and $a_{02}$, respectively, and these light attenuators are identical to the light attenuators 149-1, 149-2, 149-3, 149-4, 149-5, 149-6, 151-1, 151-2 and 151-3. Also, the light transmission factors of light attenuators 149-1-2, 149-2-2, 149-3-2, 149-4-2, 149-5-2, 149-6-2, 151-1-2, 151-2-2 and 151-3-2 are proportional to $b_{10}$, $b_{13}$, $b_{15}$, $b_{11}$, $b_{14}$, $b_{12}$, $a_{10}$, $a_{11}$ and $a_{12}$, respectively, which are the coefficients for obtaining M' in equation (1). The light transmission factors of light attenuators 149-1-3, 149-2-3, 149-3-3, 149-4-3, 149-5-3, 149-6-3, 151-1-3, 151-2-3 and 151-3-3 are proportional to $b_{20}$, $b_{23}$, $b_{25}$, $b_{21}$, $b_{24}$, $b_{22}$, $b_{20}$, $a_{21}$ and $a_{22}$, respectively, which are the coefficients for obtaining Y' in equation (1).

Thus, outputs similar to those in the case of FIG. 37 are obtained from photodetectors 150-1-1, 150-2-1, 150-3-1, 150-4-1, 150-5-1, 150-6-1, 152-1-1, 152-2-1 and 152-3-1, and the C' signal can be obtained by processing these outputs by the signal processing circuit of FIG. 38.

Outputs substantially proportional to $b_{10}C^2$, $b_{13}CM$, $b_{15}YC$, $b_{11}M^2$, $b_{14}MY$, $b_{12}Y^2$, $a_{10}C$, $a_{11}M$ and $a_{12}Y$ are obtained from photodetectors 150-1-2, 150-2-2, 150-3-2, 150-4-2, 150-5-2, 150-6-2, 152-1-2, 152-2-2 and 152-3-2, and the M' signal can be obtained by suitably adding and subtracting these outputs by a circuit similar to that shown in FIG. 38.

Outputs substantially proportional to $b_{20}C^2$, $b_{23}CM$, $b_{25}YC$, $b_{21}M^2$, $b_{24}MY$, $b_{22}Y^2$, $a_{21}C$, $a_{20}M$ and $a_{22}Y$ are obtained from photodetectors 150-1-3, 150-2-3, 150-3-3, 150-4-3, 150-5-3, 150-6-3, 152-1-3, 152-2-3 and 152-3-3, and the Y' signal can be obtained by suitably adding and subtracting these outputs by a circuit similar to that shown in FIG. 38.

Thus, according to the apparatus of the present embodiment, the C' signal, the M' signal and the Y' signal can be obtained at a time.

Figure 40:
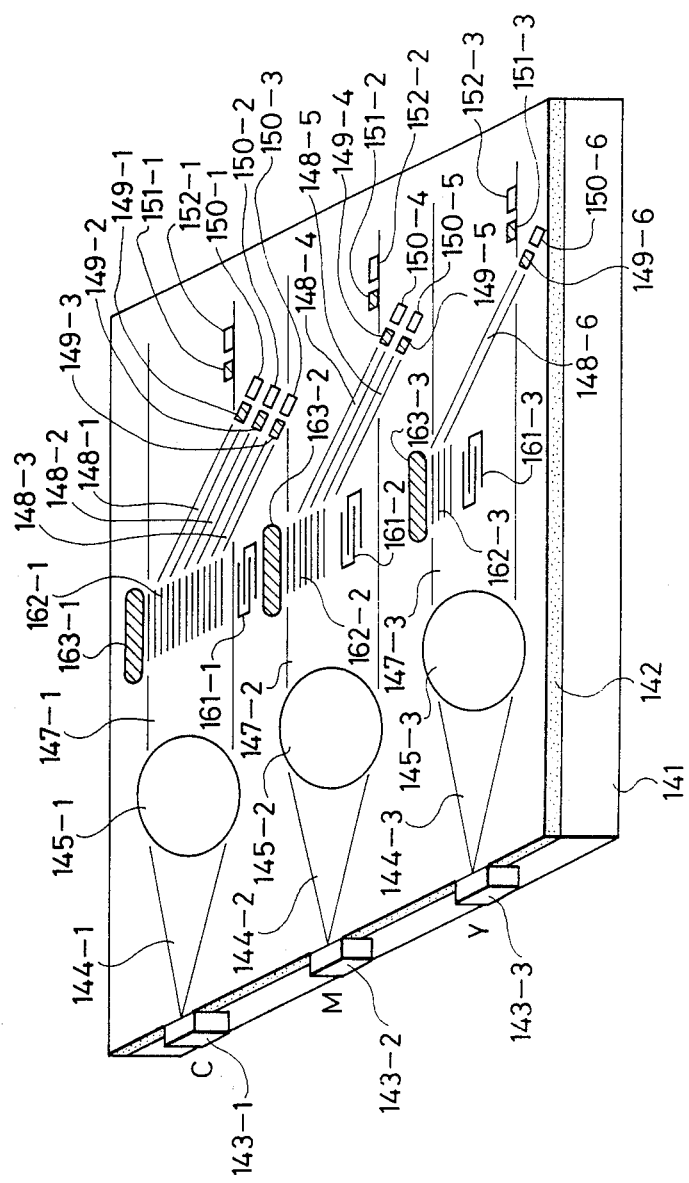
FIG. 40 is a schematic partial perspective view showing an eleventh embodiment of the present invention.

FIG. 40 is a schematic partial perspective view showing an eleventh embodiment of the optical operation apparatus of the present invention. In FIG. 40, portions similar to those in FIG. 37 are given similar reference numerals.

As the base plate 141, use may be made of crystal having the piezo-electric effect and the acousto-optical effect, such as Y-cut $LiNbO_3$ or $LiTaO_3$, and the light waveguide 142 is formed as a thin film having a higher refractive index than the crystal base plate by evaporating Ti on the surface of the crystal base plate and heat-diffusing the Ti in the crystal base plate. Also, a construction may be adopted in which glass is used as the base plate 141, $As_2S_3$ having the acousto-optical effect is used as the material of the light waveguide 142 and a ZnO layer having the piezo-electric effect is interposed only in the portion of a comb type electrode for producing an elastic surface wave in the light waveguide 142 and between the comb type electrode and the light waveguide 142. According to such a construction, the excitation efficiency of the elastic surface wave is good because ZnO having a great piezo-electric effect is used, and the light diffraction efficiency is high because $As_2S_3$ having a great acousto-optical effect is used.

Semiconductor laser light sources 143-1, 143-2 and 143-3, light beams 144-1, 144-2 and 144-3, waveguide lenses 145-1, 145-2 and 145-3 and light beams 147-1, 147-2 and 147-3 are similar to those in FIG. 37.

Reference numerals 161-1, 161-2 and 161-3 designate comb type electrodes for exciting an elastic surface wave in the light waveguide 142. The comb type electrode 161-1 is for producing an elastic surface wave 162-1 propagated through an area in which the light beam 147-1 travels, the comb type electrode 161-2 is for producing an elastic surface wave 162-2 propagated through an area in which the light beam 147-2 travels, and the comb type electrode 161-3 is for producing an elastic surface wave 162-3 propagated through an area in which the light beam 147-3 travels. Reference numerals 163-1, 163-2 and 163-3 designate sound absorbing members for absorbing the elastic surface waves 162-1, 162-2 and 162-3.

The elastic surface wave is an ultrasonic wave propagated while being trapped near the surface, and a strain and an electric field based thereon are propagated with a periodical distribution. A periodical refractive index distribution is produced in the light waveguide 142 by the acousto-optical effect and the electro-optical effect based on said strain and electric field. This refractive index distribution acts on the light beam as a moving phase diffraction grating. The intensities of the acousto-optical effect and the electro-optical effect are proportional to the intensity of the elastic surface wave.

Reference numearals 148-1, 148-2 and 148-3 designate diffracted light beams resulting from the light beam 147-1 being diffracted by the diffraction grating produced by the elastic surface wave 162-1, reference numerals 148-4 and 148-5 denote diffracted light beams resulting from the light beam 147-2 being diffracted by the elastic surface wave 162-2, and reference numeral 148-6 designates a diffracted light beam resulting from the light beam 147-3 being diffracted by the elastic surface wave 162-3.

Light attenuators 149-1–149-6 and 151-1–151-3 and photodetectors 150-1–150-6 and 152-1–152-3 are similar to those in FIG. 37.

Figure 41:
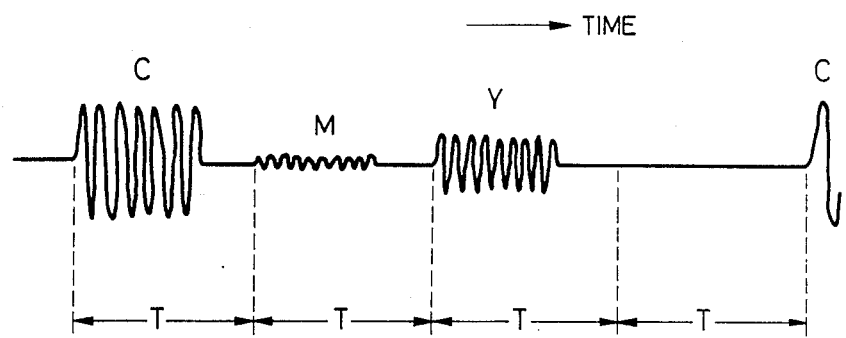
FIG. 41 shows the wave form of a comb type electrode driving signal in the apparatus shown in FIG. 40.

FIG. 41 shows the wave forms of the driving signals of the comb type electrodes 161-1, 161-2 and 161-3 in FIG. 40.

As shown, an alternating current of a constant frequency is amplitude-modulated by the C signal, the M signal and the Y signal in succession at each predetermined time interval T. A time without any signal exists between the Y signal and the C signal. The same elastic surface wave is excited from the comb type electrodes 161-1, 161-2 and 161-3.

The comb type electrodes 161-1, 161-2 and 161-3 are disposed at different positions relative to the light beams 147-1, 147-2 and 147-3, respectively. The relative positional relation between the light attenuator 149-3 and the photodetector 150-3 relative to the comb type electrode 161-1, the relative positional relation between the light attenuator 149-5 and the photodetector 150-5 relative to the comb type electrode 161-2, and the relative positional relation between the light attenuator 149-6 and the photodetector 150-6 relative to the comb type electrode 161-3 are substantially identical to one another. Also, the relative positional relation between the light attenuator 149-2 and the photodetector 150-2 relative to the comb type electrode 161-1 and the relative positional relation between the light attenuator 149-4 and the photodetector 150-4 relative to the comb type electrode 161-2 are substantially identical to each other. Further, the positional relation among the photodetectors 149-1, 149-2 and 149-3 is such that at a certain point of time, the diffracted light beam 148-1 is one diffracted by the diffraction grating based on the portion of the elastic surface wave driven by the C signal, the diffracted light beam 148-2 is one diffracted by the diffraction grating based on the portion of the elastic surface wave 162-1 driven by the M signal and the diffracted light beam 148-3 is one diffracted by the diffraction grating based on the portion of the elastic surface wave 162-1 driven by the Y signal.

Accordingly, at this point of time, said positional relation is such that the diffracted light beam 148-4 is one diffracted by the diffraction grating based on the portion of the elastic surface wave 162-2 driven by the M signal, the diffracted light beam 148-5 is one diffracted by the diffraction grating based on the portion of the elastic surface wave 162-2 driven by the Y signal, and the diffracted light beam 148-6 is one diffracted by the diffraction grating based on the portion of the elastic surface wave 162-3 driven by the Y signal.

Further, at this point of time, light beams 147-1–147-3 which are not diffracted by the elastic surface waves 162-1–162-3 arrive at the light attenuators 151-1–151-3.

It will be seen from the foregoing that the outputs from the photodetectors 150-1–150-6 and 152-1–152-3 at this point of time are just the same as those in FIG. 37. Accordingly, by processing these outputs by the use of the processing circuit shown in FIG. 38, the C' signal can be obtained and in a similar manner, the M' signal and the Y' signal can also be obtained and also, if the light attenuators and photodetectors are made similar to those shown in FIG. 39, the C' signal, the M' signal and the Y' signal can be obtained at a time just as in the above-described embodiment.

According to the present embodiment, the number of comb type electrodes may be small and the number of locations at which wiring is provided may also be small, and this leads to an advantage that the structure becomes simple.

In the above-described tenth and eleventh embodiments, there has been shown a specific example having an element structure in which the light source to the photodetectors are made integral with one another, but the apparatus of the present invention includes one in which a light source and a collimater lens are disposed at positions spaced apart from the light waveguide base plate so that a parallel light beam collimated may be introduced into the light waveguide by a prism coupler or a grating coupler, and one in which a waveguide light beam is caused to emerge out of the light waveguide by a prism coupler or a grating coupler so that it may enter a light attenuator and a photodetector disposed at positions spaced apart from the light waveguide base plate.

Also, in the tenth and eleventh embodiments, there is shown color compensation using up to the second-order term, but by additionally using a comb type electrode, suitably disposing this comb type electrode on the light waveguide, suitably setting the optical path of each light beam, driving each comb type electrode on the basis of a color signal and further utilizing a suitable attenuator, color compensation including third-order and higher order terms can also be accomplished in a similar manner.

The operation of color compensation has been described above, whereas the apparatus of the present invention can be applied not only to the operation of color compensation but also to various operations, and it can be applied, for example, to the operation for edge emphasizing in image recording. In the operation for edge emphasizing, where the intensity of the input signal of any picture element in an image is y and the intensities of the input signals of the picture elements adjacent to said any picture element are x and z, the operation of the following equation is effected to obtain the edge-emphasized output signal y' of said any picture element:

$$\begin{aligned} y' &= y + d(ax + by + cz)^3 \\ &= y + a^3 dx^3 + b^3 dy^3 + c^3 dz^3 + 6abcdxyz + \\ &\quad 3a^2 bdx^2 y + 3ab^2 dxy^2 + 3b^2 cdy^2 z + \\ &\quad 3bc^2 dyz^2 + 3c^2 adz^2 x + 3ca^2 dzx^2 \end{aligned}$$

Figure 42:
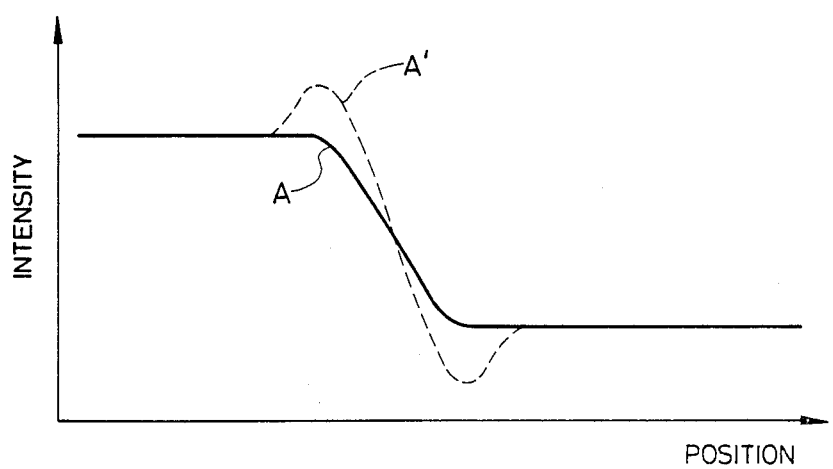
FIG. 42 shows the intensity distribution of a signal obtained when the present invention is used in edge-emphasized operation.

This means that the operation of adding a compensation term $d(ax+by+cz)^3$ to the input signal y in said any picture element, and it is generally well known that thereby there is obtained an edge-emphasized output signal having little noise and having the degree of edge emphasis determined by the coefficient d (usually $a=c=-1$ and $b=2$). Thus, in the present invention, processing similar to that described in connection with said color compensation operation is effected on three light beams having intensities corresponding to x, y and z, respectively, whereby there can be obtained an edge-emphasized output signal y'. If an operation is similarly effected for every picture element, there is obtained an output image having an edge-emphasized intensity distribution A' from the intensity distribution A of each picture element in the input image, as shown in FIG. 42.

The present invention is applicable not only to the above-described operation but also to various operations, and various modifications of the construction of the apparatus are conceivable on the basis of the illustrated embodiments.

We claim:

1. An optical operation apparatus for effecting the following operation:

$$\begin{pmatrix} S_1' \\ S_2' \\ \cdot \\ \cdot \\ \cdot \\ S_n' \end{pmatrix} = \begin{pmatrix} a_{11} & a_{12} & \cdots & a_{1m} \\ a_{21} & a_{22} & \cdots & a_{2m} \\ \cdot & & & \cdot \\ \cdot & & & \cdot \\ \cdot & & & \cdot \\ a_{n1} & a_{n2} & & a_{nm} \end{pmatrix} \begin{pmatrix} S_1 \\ S_2 \\ \cdot \\ \cdot \\ \cdot \\ S_m \end{pmatrix}$$

(n and m are integers each at least equal to 2), said apparatus comprising:

a plurality of light sources arranged in a predetermined direction and emitting light of respective intensities corresponding to said $S_1, S_2, \ldots, S_m$, respectively;

an optical filter in which m×n portions having transmission factors corresponding to absolute values of said $a_{11}, \ldots, a_{nm}$ are arranged in the form of a matrix, said portions having transmission factors corresponding to the absolute values of said $a_{1i}, a_{2i}, \ldots, a_{ni}$ and receiving the light from the one of said light sources emitting light of intensity corresponding to said Si ($i=1, \ldots, m$), respectively;

a plurality of photoelectric converting units arranged in a direction perpendicular to said predetermined direction for receiving the light beams transmitted through said optical filter and converting said light beams, into electrical signals corresponding to said $S_1', S_2', \ldots, S_n'$, at least one of said units having at least a first light receiving portion for detecting the light transmitted through at least one said portion corresponding to at least one of said $a_{11}, \ldots, a_{nm}$ which has a positive value, at least a second light-receiving portion for detecting the light transmitted through at least one said portion corresponding to at least one of said $a_{11}, \ldots, a_{nm}$ which has a negative value, and means for subtracting the signal detected by said second light-receiving portion from that detected by said first light-receiving portion.

2. An optical operation apparatus according to claim 1, wherein the light-receiving portions of said photoelectric converting units which correspond to said portions of said optical filter are arranged in the form of a matrix.

3. An optical operation apparatus according to claim 2, further comprising an optical system for forming the image of said optical filter on said photoelectric converting units.

4. An optical operation apparatus according to claim 1, wherein said $S_1, S_2, \ldots, S_m$ are color signals and said $S_1', S_2', \ldots, S_n'$ are compensated color signals.

5. An optical operation apparatus for effecting the following operation:

$$\begin{pmatrix} S_1' \\ S_2' \\ \cdot \\ \cdot \\ \cdot \\ S_n \end{pmatrix} = \begin{pmatrix} a_{11} & a_{12} & \cdots & a_{1m} \\ a_{21} & a_{22} & \cdots & a_{2m} \\ \cdot & & & \cdot \\ \cdot & & & \cdot \\ \cdot & & & \cdot \\ a_{n1} & a_{n2} & & a_{nm} \end{pmatrix} \begin{pmatrix} S_1 \\ S_2 \\ \cdot \\ \cdot \\ \cdot \\ S_m \end{pmatrix}$$

(n and m are integers each equal to or greater than 2), said apparatus comprising:

m light sources emitting lights of intensities corresponding to said $S_1, S_2 \ldots, S_m$, respectively;

an optical filter having m×n portions having transmission factors corresponding to absolute values of said $a_{11}, \ldots, a_{nm}$, respectively;

m optical fibers each having one end connected with a respective one of said light sources, the other end of each of said optical fibers being divided into n so as to guide the light from said light source emitting light of intensity corresponding to said $S_i$, to said portions of said optical filter having transmission factors corresponding to the absolute values of said $a_{1i}, a_{2i}, \ldots, a_{ni}$ ($i=1, \ldots, m$), equally in amount; and n photoelectric converting units each receiving light beams transmitted through said portions of said optical filter having transmission factors corresponding to absolute values of said $a_{i1}, \ldots, a_{im}$, and converting said light beams into electrical signals corresponding, in intensity, to said $S_i'$ ($i=1, \ldots, n$), respectively.

6. An optical operation apparatus according to claim 5, further comprising optical fibers for connecting said optical filter with said photoelectric converting units.

7. An optical operation apparatus according to claim 5, wherein at least one of of said photoelectric converting units has at least a first light-receiving portion for detecting the light transmitted through at least one said portion, if any, corresponding to at least one of said $a_{11}, \ldots, a_{nm}$ which has a positive value, at least a second light-receiving portion for detecting the light transmitted through at least one said portion, if any, corresponding to at least one of said $a_{11}, \ldots, a_{nm}$ which has a negative value, and means for subtracting the signal detected by said second light-receiving portion from that detected by said first light-receiving portion.

8. A optical operation apparatus according to claim 5, wherein said $S_1, S_2, \ldots, S_m$ are color signals and said $S_1', S_2', \ldots, S_n'$ are compensated color signals.

9. An optical operation apparatus for effecting the following operation:

$$\begin{pmatrix} S_1' \\ S_2' \\ \cdot \\ \cdot \\ \cdot \\ S_n' \end{pmatrix} = \begin{pmatrix} a_{11} & a_{12} & \cdots & a_{1m} \\ a_{21} & a_{22} & \cdots & a_{2m} \\ \cdot & \cdot & & \cdot \\ \cdot & \cdot & & \cdot \\ \cdot & \cdot & & \cdot \\ a_{n1} & a_{n2} & & a_{nm} \end{pmatrix} \begin{pmatrix} S_1 \\ S_2 \\ \cdot \\ \cdot \\ \cdot \\ S_m \end{pmatrix}$$

(n and m are integers each equal to or greater than 2), said apparatus comprising:

an optical filter having two opposite faces and $m \times n$ portions having transmission factors corresponding to absolute values of said $a_{11}, \ldots, a_{nm}$, respectively, said portions being arranged in a predetermined direction and a direction perpendicular thereto in the form of a matrix;

m light sources emitting lights of intensities corresponding to said $S_1, S_2, \ldots, S_m$, respectively, and provided on one of the two faces of said optical filter in contact therewith, each of said light sources having a light-emitting surface of the same length as said optical filter in the direction perpendicular to said predetermined direction and said light sources being arranged along said predetermined direction; and n photoelectric converting units each receiving light beams transmitted through said portions of said optical filter having transmission factors corresponding to absolute values of said $a_{i1}, \ldots, a_{im}$, and converting said light beams into electrical signals corresponding, in intensity, to said $S_i'$ ($i=1, \ldots, n$), respectively.

10. An optical operation apparatus according to claim 9, wherein each of said light sources is a surface light emission type LED.

11. An optical operation apparatus according to claim 9, wherein at least one of said photoelectric converting units has at least a first light-receiving portion for detecting the light transmitted through at least one said portion corresponding to at least one of said $a_{11}, \ldots, a_{nm}$ which has positive value, at least a second light-receiving portion for detecting the light transmitted through at least one said portion corresponding to at least one of $a_{11}, \ldots, a_{nm}$ which has a negative value, and means for subtracting the signal detected by said second light-receiving portion.

12. An optical operation apparatus according to claim 11, wherein said $s_1, S_2, \ldots, S_m$ are color signals and said $S_1', S_2', \ldots, S_n'$ are compensated color signals.

13. An optical operation apparatus according to claim 9, wherein said photoelectric converting units are provided on the other of the two faces of said optical filter in contact therewith.

14. An optical operation apparatus for effecting the following operation:

$$\begin{pmatrix} C' \\ M' \\ Y' \end{pmatrix} = A \begin{pmatrix} C \\ M \\ Y \end{pmatrix} + B \begin{pmatrix} C^2 \\ M^2 \\ Y^2 \\ CM \\ MY \\ YC \end{pmatrix}$$

$$A = \begin{pmatrix} a_{00} & a_{01} & a_{02} \\ a_{10} & a_{11} & a_{12} \\ a_{20} & a_{21} & a_{22} \end{pmatrix}$$

$$B = \begin{pmatrix} b_{00} & b_{01} & b_{02} & b_{03} & b_{04} & b_{05} \\ b_{10} & b_{11} & b_{12} & b_{13} & b_{14} & b_{15} \\ b_{20} & b_{21} & b_{22} & b_{23} & b_{24} & b_{25} \end{pmatrix},$$

said apparatus comprising:

four light sources emitting lights of intensities corresponding to a (unit signal), C, M and Y, respectively;

three modulating elements, each of said modulating elements receiving the light from said four light source and intensity-modulating said lights in accordance with C, M and Y signals, respectively;

an optical filter in which portions having transmission factors corresponding to the absolute values of said $a_{00}, \ldots, a_{22}$ and $b_{00}, \ldots, b_{25}$ are arranged in the form of a matrix and which receives the lights from said modulating elements;

a photoelectric converting element in which light-receiving portions corresponding to the respective portions of said optical filter are arranged in the form of a matrix and which detects the light transmitted through said optical filter; and a signal processing circuit for adding and subtracting the outputs of said light-receiving portions and obtaining electrical signals corresponding to said C', M', and Y', respectively.

15. An optical operation apparatus for effecting the following operation;

$$\begin{pmatrix} S_1' \\ S_2' \\ \cdot \\ \cdot \\ \cdot \\ S_n' \end{pmatrix} = \begin{pmatrix} a_{11} & a_{12} & \cdots & a_{1m} \\ a_{21} & a_{22} & \cdots & a_{2m} \\ \cdot & \cdot & & \cdot \\ \cdot & \cdot & & \cdot \\ \cdot & \cdot & & \cdot \\ a_{n1} & a_{n2} & & a_{nm} \end{pmatrix} \begin{pmatrix} S_1^2 \\ S_2^2 \\ \cdot \\ \cdot \\ \cdot \\ S_n^2 \\ S_1 \; S_2 \\ S_1 \; S_3 \\ \cdot \\ \cdot \\ \cdot \\ S_{n-1} \; S_n \end{pmatrix}$$

($m = (n^2 + n)/2$, n being integers equal to or greater than 2), said apparatus comprising:
n light sources emitting lights of intensities corresponding to said $S_1, S_2, \ldots, S_n$, respectively;
n modulating devices, each one of said devices receiving lights from said n light sources and intensity-modulating said light in accordance with signal of $S_i$ ($i = 1, \ldots, n$);
an optical filter for receiving lights from said modulating devices, said optical filter having m×n portions having transmission factors corresponding to absolute values of said $a_{11}, \ldots, a_{nm}$, respectively, and arranged in the form of a matrix;
a photoelectric converting device having light-receiving portions corresponding to said respective portions of said optical filter and arranged in the form of a matrix, said light-receiving portions detecting the light transmitted through said corresponding portions of said optical filter, respectively; and
a signal processing circuit for adding and subtracting outputs of said light-receiving portions and obtaining signals corresponding, in intensity, to said $S_1'$, $S_2', \ldots, S_m'$, respectively, said portions of said optical filter receiving the lights from said modulating devices in such a manner that said signal processing circuit can obtain said signals.

16. An optical operation apparatus according to claim 15, wherein said modulating device is a diffraction type light modulating element which diffracts the lights from said light sources.

17. An optical operation apparatus according to claim 16, wherein the light from said n light sources is caused to be incident on said diffraction type light modulating element at mutually different angles.

18. An optical operation apparatus according to claim 16, wherein the lights from said n light sources have mutually different wavelengths.

19. An optical operation apparatus according to claim 16, wherein said diffraction type light modulating element is an acousto-optical element, and the signals of said $S_1, S_2, \ldots, S_n$ are input to said acousto-optical element with the frequencies thereof being made different and multiplex.

20. An optical operation apparatus according to claim 16, wherein each of the lights emitted from said light sources is coupled to a thin film light waveguide, and said acoustic-optical element is provided in said thin film light waveguide.

21. An optical operation apparatus according to claim 15, wherein said diffraction type light modulating element is an electro-optical element.

22. An optical operation apparatus for effecting the following operation:

$$\begin{pmatrix} S_1' \\ S_2' \\ \cdot \\ \cdot \\ \cdot \\ S_n' \end{pmatrix} = \begin{pmatrix} a_{11} & a_{12} & \cdots & a_{1m} \\ a_{21} & a_{22} & \cdots & a_{2m} \\ \cdot & \cdot & & \cdot \\ \cdot & \cdot & & \cdot \\ \cdot & \cdot & & \cdot \\ a_{n1} & a_{n2} & & a_{nm} \end{pmatrix} \begin{pmatrix} S_1^2 \\ S_2^2 \\ \cdot \\ \cdot \\ \cdot \\ S_n^2 \\ S_1 \; S_2 \\ S_2 \; S_3 \\ \cdot \\ \cdot \\ \cdot \\ S_{n-1} \; S_n \end{pmatrix}$$

($m = (n^2 + n)/2$, n being integers equal to or greater than 2), said apparatus comprising:
n light sources emitting lights of intensities corresponding to said $S_1, S_2, \ldots, S_n$, respectively;
n modulating devices, each one of said devices receiving lights from said n light source and intensity-modulating said lights in accordance with signal of $S_i$ ($i = 1, \ldots, n$);
an optical filter for receiving lights from said modulating devices, said optical filter having m portions having different transmission factors and the transmission factors of said m portions of said optical filter being changed to correspond to said $a_{i1}, a_{i2}, \ldots, a_{im}$ ($i = 1, \ldots, n$);
a photoelectric converting device having m light-receiving portions corresponding to said respective portions of said optical filter detecting for detecting the lights transmitted through said optical filter; and
a signal processing circuit for adding and subtracting outputs of said light-receiving portions and obtaining signals corresponding, intensity, to said $S_i'$, when said transmission factors are changed to correspond to $a_{11}, a_{12}, \ldots, a_{im}$ ($i = 1, \ldots, n$), said portions of said optical filter receiving the lights from said modulating devices in such a manner that said signal processing circuit can obtain said signals.

23. An optical operation apparatus according to claim 22, wherein said modulating device is a diffraction type light modulating element which diffracts the lights from said light sources.

24. An optical operation apparatus according to claim 23, wherein the lights from said n light sources are caused to be incident on said diffraction type light modulating element at mutually different angles.

25. An optical operation apparatus according to claim 23, wherein the lights from said n light sources have mutually different wavelengths.

26. An optical operation apparatus according to claim 23, wherein said diffraction type light modulating element is an acousto-optical element, and the signals of said $S_1, S_2, \ldots, S_n$ are input to said acousto-optical element with the frequencies thereof being made different and multiplex.

27. An optical operation apparatus according to claim 23, wherein each of the lights emitted from said light sources is coupled to a thin film light waveguide, and said acousto-optical element is provided in said thin film light waveguide.

28. An optical operation apparatus according to claim 23, wherein said diffraction type light modulating element is an electro-optical element.

29. An optical operation apparatus according to claim 22, wherein said portions of said optical filter and said m light-receiving portions of said photoelectric converting device are arranged in the form of a matrix, respectively.

30. An optical operation apparatus for effecting the following operation:

$$\begin{pmatrix} C' \\ M' \\ Y' \end{pmatrix} = A \begin{pmatrix} C \\ M \\ Y \end{pmatrix} + B \begin{pmatrix} C^2 \\ M^2 \\ Y^2 \\ CM \\ MY \\ YC \end{pmatrix}$$

$$A = \begin{pmatrix} a_{00} & a_{01} & a_{02} \\ a_{10} & a_{11} & a_{12} \\ a_{20} & a_{21} & a_{22} \end{pmatrix}$$

$$B = \begin{pmatrix} b_{00} & b_{01} & b_{02} & b_{03} & b_{04} & b_{05} \\ b_{10} & b_{11} & b_{12} & b_{13} & b_{14} & b_{15} \\ b_{20} & b_{21} & b_{22} & b_{23} & b_{24} & b_{25} \end{pmatrix},$$

said apparatus comprising:
three light source emitting lights of intensities corresponding to said C, M and Y, respectively;
four modulating elements, each of said modulating elements receiving the lights from said three light sources, three of said four modulating elements intensity-modulating said lights in accordance with C, M, Y and 1 (unit signal) signals and one of said four modulating elements transmitting said lights without any intensity-modulation;
an optical filter in which portions having transmission factors corresponding to the absolute values of said $a_{00}, \ldots, a_{22}$ and $b_{00}, \ldots, b_{25}$ are arranged in the form of a matrix and which receives the lights from said modulating elements;
a photoelectric converting element in which light-receiving portions corresponding to the respective portions of said optical filter are arranged in the form of a matrix and which detects the lights transmitted through said optical filter; and
a signal processing circuit for adding and subtracting the outputs of said light-receiving portions and obtaining electrical signals corresponding to said C', M' and Y', respectively.

31. An optical operation apparatus for effecting the following operation:

$$\begin{pmatrix} S_1' \\ S_2' \\ \cdot \\ \cdot \\ \cdot \\ S_n' \end{pmatrix} = \begin{pmatrix} a_{11} & a_{12} & \ldots & a_{1m} \\ a_{21} & a_{22} & \ldots & a_{2m} \\ \cdot & \cdot & & \cdot \\ \cdot & \cdot & & \cdot \\ \cdot & \cdot & & \cdot \\ a_{n1} & a_{n2} & & a_{nm} \end{pmatrix} \begin{pmatrix} S_1 \\ S_2 \\ \cdot \\ \cdot \\ \cdot \\ S_m \end{pmatrix}$$

(n and m are integers each equal to or greater than 2), said apparatus comprising:
m light sources emitting light beams of intensities corresponding to said $S_1, S_2, \ldots, S_m$, respectively;
an optical filter having m×n portions having transmission factors corresponding to absolute values of said $a_{11}, \ldots, a_{nm}$, respectively;
n photoelectric converting units each receiving light beams transmitted through said portions of said optical filter having transmission factors corresponding to absolute values of said $a_{i1}, \ldots, a_{im}$, and converting the light beams into electrical signals corresponding, in intensity, to said $S_i'$ ($i=1, \ldots, n$), respectively; and
n optical fibers each having one end connected with a respective one of said photoelectric converting units, the other end of each of said optical fibers being divided into m so as to guide the light beams transmitted through said portions of said optical filter having the transmission factors corresponding to said $a_{i1}, a_{i2}, \ldots, a_{im}$ ($i=1, \ldots, n$) to said photoelectric converting unit for outputting the electrical signal corresponding to said $S_i'$.

* * * * *

UNITED STATES PATENT AND TRADEMARK OFFICE
CERTIFICATE OF CORRECTION

PATENT NO. : 4,815,027
DATED : March 21, 1989
INVENTOR(S) : JUN TOKUMITSU, ET AL.

It is certified that error appears in the above-identified patent and that said Letters Patent is hereby corrected as shown below:

ON TITLE PAGE:

IN [56] REFERENCES CITED

U.S. PATENT DOCUMENTS, "Cawfield et al." should read --Caulfield et al.--.

COLUMN 1

Line 48, "utilized" should read --utilizes--.

COLUMN 3

Line 68, "eeffected," should read --effected,--.

COLUMN 4

Line 41, "$a_{00}-a_{33}$" should read --$a_{00}-a_{22}$--.
    Line 47, "LEDs)" should read --LEDs).--.

COLUMN 5

Line 10, "FIG. 14" should read --FIG. 4--.
    Line 30, "y direction," should read --the y direction,--.

COLUMN 6

Line 4, "lines" should read --lines.--.
    Line 55, "y direction" should read --the y direction--.

UNITED STATES PATENT AND TRADEMARK OFFICE
CERTIFICATE OF CORRECTION

PATENT NO. : 4,815,027

DATED : March 21, 1989

INVENTOR(S) : JUN TOKUMITSU, ET AL.

Page 2 of 5

It is certified that error appears in the above-identified patent and that said Letters Patent is hereby corrected as shown below:

COLUMN 8

Line 24, "are obtained from" - Italics should be deleted.
Line 25, Italics should be deleted.
Line 37, "reference numeral" should read --reference numerals--.
Line 60, "are" should read --are attached, are--.

COLUMN 9

Line 4, "$a_{01}$, $a_{12}a_{21}$" should read --$a_{01}$, $a_{12}$, $a_{21}$--.
Line 40, "x direction." should read --the x direction.--.

COLUMN 10

Line 56, "$b_{00}C_2$" should read --$b_{00}C^2$--.
Line 57, "is obtained from a" - Italics should be deleted.
Line 58, Italics should be deleted.

COLUMN 12

Line 42, Italics should be deleted.

COLUMN 13

Line 27, "Accordignly," should read --Accordingly,--.
Line 42, "$a_{00}-a_{33}$" should read --$a_{00}-a_{22}$--.

UNITED STATES PATENT AND TRADEMARK OFFICE
CERTIFICATE OF CORRECTION

PATENT NO. : 4,815,027
DATED : March 21, 1989
INVENTOR(S) : JUN TOKUMITSU, ET AL.

Page 3 of 5

It is certified that error appears in the above-identified patent and that said Letters Patent is hereby corrected as shown below:

COLUMN 14

Line 3, "four wave-" should read --four different wave- --.
Line 23, "jur-" should read --jux- --.

COLUMN 15

Line 8, "$a_{00}C - a_{01}M$" should read --$a_{00}C + a_{01}M$--.
Line 9, "$b_{00}C^2 + b_{01}M^2 + b_{02}Y^2 - b_{03}CM - b_{04}MY + b-$" should read --$b_{00}C^2 - b_{01}M^2 + b_{02}Y^2 + b_{03}CM - b_{04}MY - b-$ --.
Line 10, Italics should be deleted.

COLUMN 16

Line 52, "$a_{00} - a_{33}$" should read --$a_{00} - a_{22}$--.

COLUMN 17

Line 66, "partily" should read --partially--.

COLUMN 23

Line 39, "numearals" should read --numerals--.

COLUMN 25

Lines 29-30, delete both lines.
Line 31, "picture element, and it" should read --It--.

UNITED STATES PATENT AND TRADEMARK OFFICE
CERTIFICATE OF CORRECTION

PATENT NO. : 4,815,027
DATED : March 21, 1989
INVENTOR(S) : JUN TOKUMITSU, ET AL.

It is certified that error appears in the above-identified patent and that said Letters Patent is hereby corrected as shown below:

COLUMN 26

Line 10, "Si" should read --$S_i$--.
Line 14, "light," should read --light--.
Line 15, "beams," should read --beams--.

COLUMN 27

Line 12, "of of" should read --of--.

COLUMN 28

Line 10, "$s_1, S_2, \ldots, S_m$" should read --$S_1, S_2, \ldots, S_m$--.
Line 44, "a (unit signal)," should read --1 (unit signal),--.
Line 47, "light" (first occurrence) should read --lights--.
Line 48, "source" should read --sources--.
Line 60, "light" should read --lights--.
Line 68, "operation;" should read --operation:--.

COLUMN 29

Line 25, "light" should read --lights--.

UNITED STATES PATENT AND TRADEMARK OFFICE
CERTIFICATE OF CORRECTION

PATENT NO. : 4,815,027
DATED : March 21, 1989
INVENTOR(S) : JUN TOKUMITSU, ET AL.

Page 5 of 5

It is certified that error appears in the above-identified patent and that said Letters Patent is hereby corrected as shown below:

COLUMN 30

Line 2, "15," should read --16,--.
Line 29, "source" should read --sources--.
Line 40, "detecting" should be deleted.
Line 45, "intensity," should read --in intensity,--.
Line 47; "$a_{11}, a_{12}, ..., a_{im}$-- should read --$a_{11}, a_{12}, ..., a_{im}$--.

COLUMN 31

Line 38, "source" should read --sources--.

Signed and Sealed this

Fourth Day of June, 1991

Attest:

HARRY F. MANBECK, JR.

Attesting Officer

Commissioner of Patents and Trademarks